(12) United States Patent
Siddiqui et al.

(10) Patent No.: US 12,381,937 B2
(45) Date of Patent: *Aug. 5, 2025

(54) VIRTUAL RESEARCH PLATFORM

(71) Applicant: IntellixAI, Inc., San Jose, CA (US)

(72) Inventors: Khan Mohammad Siddiqui, Hinsdale, IL (US); Robert Bakos, Carol Stream, IL (US); Gerard M. Stegmaier, Culpeper, VA (US); Oliver Chen, Woodside, CA (US)

(73) Assignee: IntellixAI, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/109,133

(22) Filed: Feb. 13, 2023

(65) Prior Publication Data

US 2024/0028618 A1 Jan. 25, 2024

Related U.S. Application Data

(63) Continuation of application No. 17/745,781, filed on May 16, 2022, now Pat. No. 11,580,138, which is a continuation of application No. 16/696,978, filed on Nov. 26, 2019, now Pat. No. 11,468,097.

(60) Provisional application No. 62/771,521, filed on Nov. 26, 2018.

(51) Int. Cl.
*G06F 16/28* (2019.01)
*G06F 16/22* (2019.01)
(Continued)

(52) U.S. Cl.
CPC .......... *H04L 67/10* (2013.01); *G06F 16/2228* (2019.01); *G06F 16/285* (2019.01);
(Continued)

(58) Field of Classification Search
CPC ........................ G06F 16/285; G06F 16/2228
See application file for complete search history.

(56) References Cited

U.S. PATENT DOCUMENTS 11,468,097 B2 10/2022 Siddiqui et al.
11,580,138 B2 2/2023 Siddiqui et al.
(Continued)

OTHER PUBLICATIONS

U.S. Appl. No. 16/696,978, Non-Final Office Action, Mailed On Jul. 14, 2021, 19 pages.
U.S. Appl. No. 16/696,978, Notice of Allowance, Mailed On Jan. 13, 2022, 12 pages.

*Primary Examiner* — Allen S Lin
(74) *Attorney, Agent, or Firm* — DENTONS Durham Jones Pinegar

(57) ABSTRACT

Systems and methods for automated data curation and presentation are disclosed herein. The system can include a memory including a structured database and a plurality of storage bins. The system can include at least one server that can receive a packetized data file generated from a data file. This packetized data file can include a first packet generated from a content file of the data file, a second packet generated from metadata of the data file, and a third packet generated from a payload of the data file. The at least one server can automatically generate at least one tag for the packetized data file, which at least one tag is automatically generated based at least one key phrase identified in at least the targeted portion of the content file. The at least one server can index the packetized data file according to the at least one tag into a predetermined taxonomy, receive a data request including a plurality of parameters identifying attributes of packetized data, and deliver curated data selected according to the at least some of the plurality of parameters of the data request.

20 Claims, 12 Drawing Sheets

(51) Int. Cl.
*H04L 12/66* (2006.01)
*H04L 67/10* (2022.01)
*H04L 67/1097* (2022.01)
*H04L 67/01* (2022.01)

(52) U.S. Cl.
CPC .......... *H04L 12/66* (2013.01); *H04L 67/1097* (2013.01); *H04L 67/01* (2022.05)

(56) References Cited

U.S. PATENT DOCUMENTS

| | | | |
|---|---|---|---|
| 2003/0093485 A1* | 5/2003 | Dougall | H04L 12/1868 709/208 |
| 2003/0204480 A1* | 10/2003 | Heinrichs | G06Q 10/087 |
| 2010/0257156 A1* | 10/2010 | Hiroi | G11B 27/34 707/741 |
| 2012/0002976 A1* | 1/2012 | Gerber | F41G 3/2683 398/140 |
| 2014/0040213 A1* | 2/2014 | Rossi | G06F 16/24575 707/693 |
| 2015/0134962 A1* | 5/2015 | Mahajan | H04L 63/061 713/171 |
| 2018/0196833 A1* | 7/2018 | Corradi | G06F 16/215 |
| 2018/0343135 A1* | 11/2018 | Cheung | H04M 3/42127 |
| 2019/0182369 A1* | 6/2019 | Gauvin | G06Q 20/123 |
| 2019/0236490 A1* | 8/2019 | Harang | G06N 20/00 |
| 2020/0167373 A1 | 5/2020 | Siddiqui et al. | |

* cited by examiner

VIRTUAL RESEARCH PLATFORM

CROSS-REFERENCES TO RELATED APPLICATIONS

This application is a continuation of U.S. patent application Ser. No. 17/745,781, filed on May 16, 2022, by Siddiqui et al., entitled "Virtual Research Platform," which claims priority to U.S. patent application Ser. No. 16/696,978, filed on Nov. 26, 2019, by Siddiqui et al., entitled "Virtual Research Platform," which claims the benefit of U.S. Provisional Application No. 62/771,521, by Siddiqui et al., entitled "Virtual Research Platform," filed on Nov. 26, 2018, which are assigned to the assignee hereof and incorporated by reference herein in their entirety for all purposes.

BACKGROUND

Techniques described herein relate to cloud-based content data aggregation for shared for limited-use research. More specifically, proprietary data belonging to content owners may be made available to users of a virtual research platform for use with custom research models, collaboration of workflows, without permitting users to download or alter the proprietary data.

The evolution of big data analytics and machine learning techniques has opened new opportunities for collaborative research. Such analytic techniques generally require large volumes of data from heterogeneous sources or of great variety in scope to ensure robustness of any given technique or model. Collaboration between generators of content data may enable the wide-scale aggregation of content data for use in collaborative research projects requiring large amounts of data.

File sharing and group document-editing are important components of collaborative research projects. Collaboration platforms enabling file sharing and editing between groups of users no longer require enterprise networks, but are available in cloud-based applications. For example, files may be shared within a user group through cloud-based Hypertext Transfer Protocol Secure (HTTPS) based virtual research room server s. A cloud-based key management server/service (KMS) may store, share, and create encryption keying material while decoupling the security from any collaboration or communication platform. Files may thus be shared amongst group users and protected from external manipulation.

However, cloud-based file sharing platforms do not enable viewing and use of files without transferring the files from the owner to other users. Research organizations and generators of content data often have a strong proprietary interest in the data/files they generate because of the resource expenditures in equipment, manpower, and time needed to produce the data/files. These organizations may be willing to enable the user of their data/files by other organizations for the purposes of big data analytics research, but may be unwilling to relinquish control over the data itself.

Additional limitations in cloud-based research include the regulatory and compliance risk associated with data sharing including (often) encryption requirements, record-keeping and accountability and other legal and risk-related requirements that typically delay, limit or even preclude the use of sensitive data, especially health-related data and image data for AI/ML research.

A collaboration platform is needed that enables users to view and analyze data from heterogeneous content sources without compromising the rights of data owners. The solution should a) create platform; b) enable search; c) enable research; d) enable collaboration, transactions and community in a manner that addresses the unique current limitations imposed by the type/nature of medical imaging (and imaging markets), HIPAA/health/law and regulatory and, privacy considerations. The various embodiments present a virtual research room that enables users to access and analyze content data of numerous content owners, while maintaining the content data within the control of the owners.

BRIEF SUMMARY

One aspect of the present disclosure relates to a system for automated data curation and presentation. The system includes memory including a structured database and a plurality of storage bins, and at least one server communicatingly coupled with the memory. The at least one server can receive a packetized data file generated from a data file, the packetized data file including a first packet generated from a content file of the data file, a second packet generated from metadata of the data file, and a third packet generated from a payload of the data file. In some embodiments, each of the packets can include targeted portions excluding personalized data. The at least one server can automatically generate at least one tag for the packetized data file, the at least one tag can be automatically generated based at least one key phrase identified in at least the targeted portion of the content file. The at least one server can index the packetized data file according to the at least one tag into a predetermined taxonomy, receive a data request, the data request including a plurality of parameters identifying attributes of packetized data, and deliver curated data selected according to the at least some of the plurality of parameters of the data request.

In some embodiments, the system can include a gateway client application. The gateway client application can packetize the data file. In some embodiments, packetizing the data file includes: identifying targeted portions of at least the payload and the content file the targeted portions selected to exclude personalized data, and extracting the targeted portions from the data file. In some embodiments, extracting targeted portions de-identifies the extracted targeted portions from the data file.

In some embodiments, packetizing the data file further includes: generating a first packet from the content file; generating a second packet from the metadata of the data file; and generating a third packet from the payload of the data file. In some embodiments, the first packet is stored in a first bin of the storage bins, the second packet is stored in a second bin of the storage bins, and the third packet is stored in a third bin of the storage bins. In some embodiments, the gateway client application is on the at least one server.

In some embodiments, automatically generating at least one tag for the packetized data file includes: selecting the third data packet generated from the payload; identifying a horizontally linked packet, which horizontally linked packet includes the first data packet associated with the selected third data packet; and evaluating the first data packet. In some embodiments, evaluating the first data packet includes: parsing the first data packet; identifying character strings within the first data packet; generating an evidence score for each of the identified character strings; and linking the generated evidence score to the character string for which the evidence score was generated.

In some embodiments, the at least one server can: determine an insufficiency of the evidence score for a character string; identify at least one linked vertical packet; evaluate the identified vertical packet; and modify the evidence score based on the evaluation of the identified vertical packet. In some embodiments, indexing the packetized data file includes storing each of the first, second, and third packets in a structured database. In some embodiments, the at least one server can: identify related data files; and link the generated data packets to data packets generated for related data files. In some embodiments, the at least one server can transmit the linked data packets to an indexing server. In some embodiments, the at least one server can: evaluate the taxonomy; identify a data insufficiency for at least one category in the taxonomy; identify a subset of data potentially relevant to the at least one category in the taxonomy; and take action to mitigate the data insufficiency.

One aspect of the present disclosure relates to a method for automated data curation and presentation. The method includes receiving a data file from a plurality of sources, the data file including: a payload; metadata; and a content file. The method can include packetizing the data file. In some embodiments packetizing the data file includes: identifying targeted portions of at least the payload and the content file the targeted portions selected to exclude personalized data; and extracting the targeted portions from the data file. In some embodiments, extracting targeted portions de-identifies the extracted targeted portions from the data file. The method can include automatically generating at least one tag for the packetized data file, which at least one tag can be automatically generated based at least one key phrase identified in at least the targeted portion of the content file. The method can include indexing the packetized data file according to the at least one tag into a predetermined taxonomy, receiving a data request, the data request including a plurality of parameters identifying attributes of packetized data, and delivering curated data selected according to the at least some of the plurality of parameters of the data request.

In some embodiments, packetizing the data file can include: generating a first packet from the content file; generating a second packet from the metadata of the data file; and generating a third packet payload of the data file. In some embodiments, the first packet is stored in a first database, the second packet is stored in a second database, and the third packet is stored in a third database. In some embodiments, automatically generating at least one tag for the packetized data file includes: selecting the third data packet generated from the payload; identifying a horizontally linked packet, which horizontally linked packet includes the first data packet associated with the selected third data packet; and evaluating the first data packet.

In some embodiments, evaluating the first data packet includes: parsing the first data packet; identifying character strings within the first data packet; generating an evidence score for each of the identified character strings; and linking the generated evidence score to the character string for which the evidence score was generated. In some embodiments, the method includes: determining an insufficiency of the evidence score for a character string; identifying at least one linked vertical packet; evaluating the identified vertical packet; and modifying the evidence score based on the evaluation of the identified vertical packet.

In some embodiments, indexing the packetized data file includes storing each of the first, second, and third packets in a structured database. In some embodiments, the method includes: identifying related data files; and linking the generated data packets to data packets generated for related data files. In some embodiments, the method includes transmitting the linked data packets to an indexing server. In some embodiments, the method includes: evaluating the taxonomy; identifying a data insufficiency for at least one category in the taxonomy; identifying a subset of data potentially relevant to the at least one category in the taxonomy; and taking action to mitigate the data insufficiency.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure. The present disclosure is described in conjunction with the appended figures.

In the figures, similar backings and/or features may have the same reference label. Where the reference label is used in the specification, the description is applicable to any one of the similar backings having the same reference label.

DETAILED DESCRIPTION

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Figure 1:
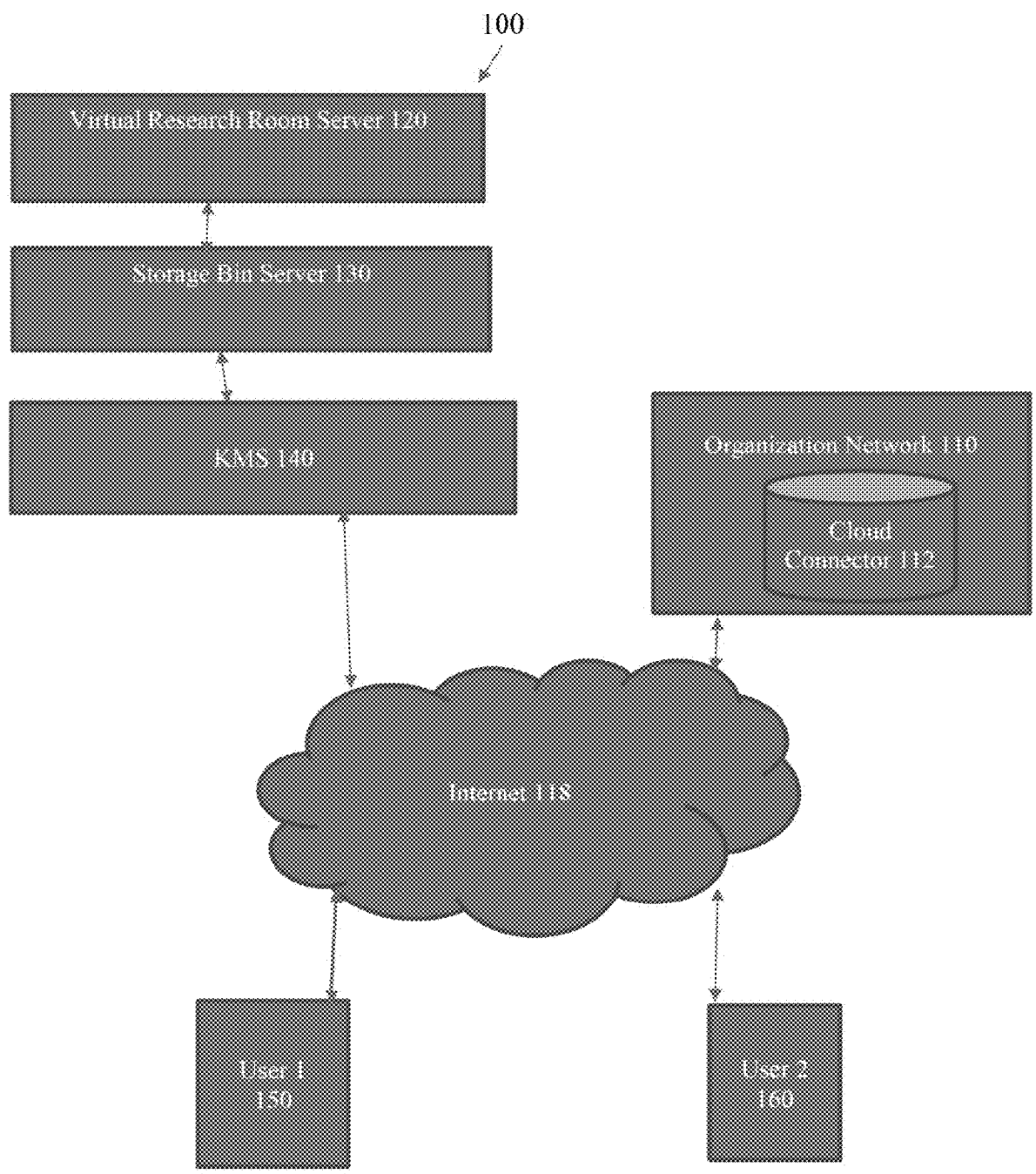
FIG. 1 is a block diagram of an exemplary communication system suitable for supporting a cloud-based virtual research platform, according to various embodiments.

FIG. 1 illustrates a network environment 100 suitable for implementation of the various embodiments described herein. An organization network 110 with a cloud connector 112 that connects the organization network 110 to various cloud services or applications through the Internet 118. In network environment 100, the cloud connector 112 connects the organization network 110, through Internet 118, to a virtual research room server 120, a Storage bin server/platform 130, and a Key Management Service ("KMS") 140. The virtual research room server 120 is a cloud-based service that allows users to access files stored within organization network 110 and may be hosted by a cloud collaboration service. In some embodiments, the virtual research room server 120 is an HTTPS virtual research room server 120, but in other embodiments the virtual research room server 120 may be any type of virtual research room server with any method of access. Optionally, a storage bin server 130 is also a cloud-based service and may be hosted by a service provider in order to offer various temporary content data storage, monitoring, or security-related services for content data. The virtual research room server 120 and the storage bin server 130 include memory 122 and 132, a processor 124 and 134, and a network interface unit 126 and 136, respectively. The network interface units 126 and 136 enable network connectivity, such as to the Internet 118. KMS 140 enables the virtual research room platform to generate and assign keys to content owners, enabling content owners to control access to their proprietary content data.

In some embodiments, each of the virtual research room server 120, the storage bin server 130, and the KMS 140 may be hosted by the same or different public cloud services and/or offered by different service providers. Moreover, each of the virtual research room server 120, the storage bin server 130, and the KMS 140 could be one or more physical servers or one or more virtual machine processes running in a data center/cloud computing environment. The virtual research room server 120 and the storage bin server 130 may have memory 122 and memory 132, respectively. Generally, memory 122 and memory 132 may each include read only memory (ROM), random access memory (RAM), magnetic disk storage media devices, optical storage media devices, flash memory devices, electrical, optical or other physical/tangible (e.g., non-transitory) memory storage devices. Thus, in general, the memory 122 and memory 132 may each be or include one or more non-transitory computer readable storage media (e.g., a memory device) encoded with software comprising computer executable instructions. For example, memory 122 may store instructions that may be executed by processor 124 for performing tasks associated with leveraging storage bin to copy and temporarily store files requested by the virtual research room server 120 on behalf of a user.

The computing devices of various users may also communicate with the network environment 100. For example, a first user 150 (User 1) on a work network 152 may communicate with the network environment 100 through a workstation 154 and a second user 160 (User 2) on a mobile network 162 may communicate with the computing environment 100 through a mobile phone 164. Other computing devices such as laptop computers, tablets, smartphones, wearable devices, etc. may be used to communicate with the network environment 100. The term "user" refers to art action taken by and through the user's associated computing device (such as workstation 154 for the first user 150 (User 1) and the mobile phone 164 for the second user (User 2)).

The users 150, 160 in network environment 100 may search for and request access to files located on computing devices of other users or within the organization network 110 and indexed by the virtual research room server 120 via the Internet 118. In FIG. 1. User 1 150 is shown transferring a file to the storage bin server 130 via pathway 172 and User 2 160 is shown accessing the file via the virtual research room server 120 on a pathway 174. In addition to providing pathways 172, 174 for file transfer and access, network environment 100 may also enable different cloud-based services, platforms, and/or applications to communicate with each other. For example, in FIG. 1, virtual research room server 120 is shown communicating, via pathway 182, with the storage bin server 130 and the storage bin server 130 is shown communicating, via pathway 184, with the KMS 140. These communications may be initiated and authorized by the cloud connector 112 of the organization network 110 to enable terminate user access to proprietary data copied to storage bin server 130.

Figure 2:
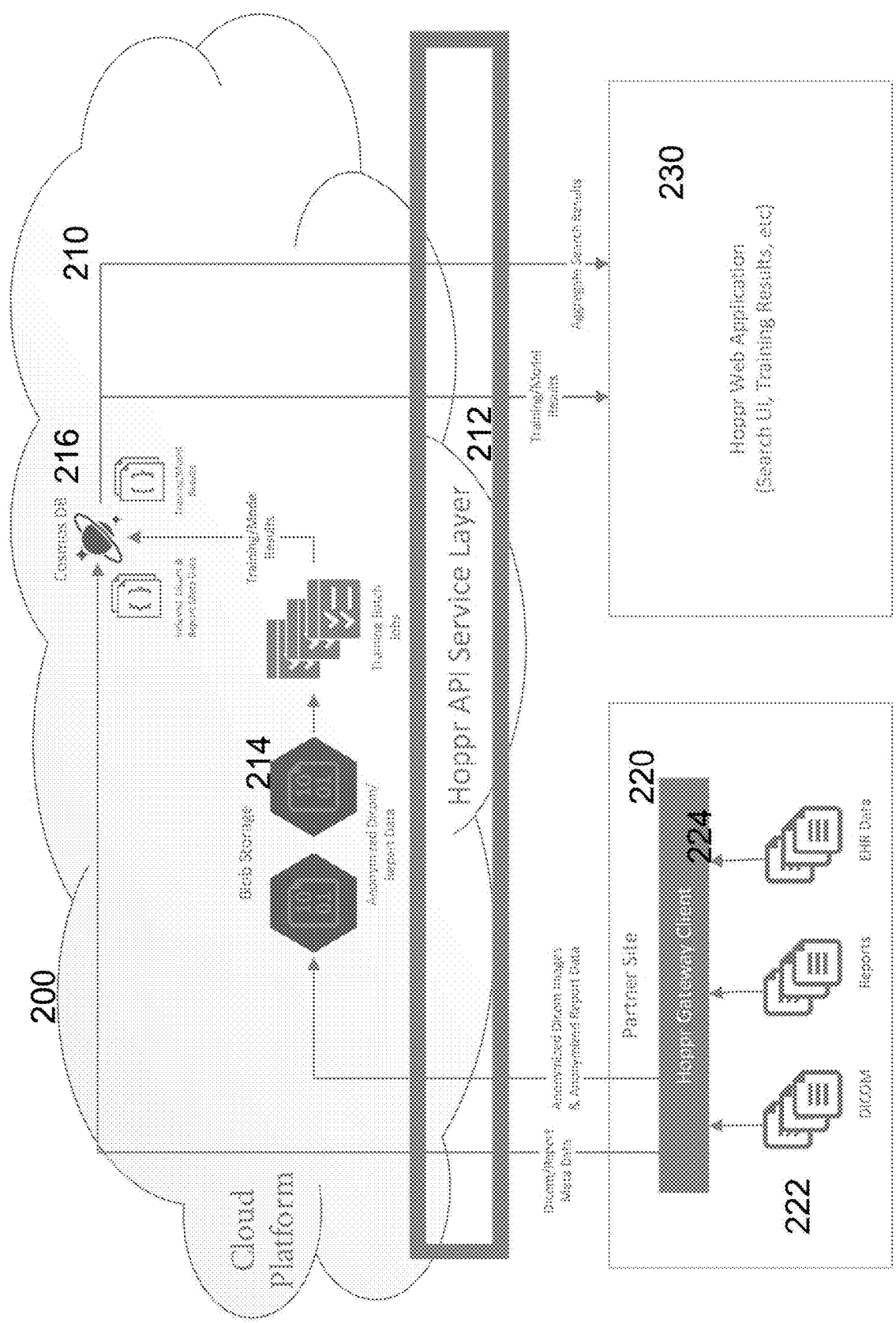
FIG. 2 is a block diagram of a virtual research platform, according to various embodiments.

FIG. 2 illustrates a block diagram a virtual research platform 200. With reference to FIGS. 1-2, a virtual research platform 200 may include communications and file transfer between the computing device of a content owner (e.g., organization network 110) at a partner site and one or more servers of the cloud-based virtual research room (e.g., servers 120, 130, and 140). The various components of the virtual research room 210 of the virtual research platform 200 may accept content data metadata as input, receive and processes research queries, copy content data from a user to a digital storage bin, and provide a querying user with limited access to analyze the content data.

A computing device of a content owner 220 such as a hospital, university, phone company, physician's office, or entertainment content producer, may include one or more partitioned file directories or file servers for storing content data 222. In the illustrated example of a medical facility, content data may include medical images, e.g. Digital Images and Communications (DICOM) files, Electronic Health Record (EHR) files, and other records related to the administration of a medical facility. In other examples, content data may include other types of images, audio samples, video files, and a variety of text data. This content data may be stored in a manner conventional to medical facility administration or may be stored in a secure partition to prevent cross-contamination of data.

A gateway client application 224 operating on the computing device of the content owner 220 provides an interface with the virtual research room 210. The gateway client application may monitor and track the content data 222 maintained by the content owner 220. In various embodiments, the gateway client application 224 may analyze the metadata of each file of the content data 222 and may provide the metadata information to the virtual research room 210 for addition to a database 216. Metadata information may include the type of image testing performed, a portion of the body imaged, demographic information, symptom reported, diagnosis, equipment used for imaging, date of testing, other forms of medical testing, test results, and the like. Because portions of this information, taken in combination may be patient-identifying, the virtual research platform 200 may scrub or otherwise anonymize a portion of the metadata for each image. Potentially patient identifying information may be scrubbed from the content data as it is transferred to the virtual research room 210 and a digital storage bin 214. The database 216 of the virtual research room 210 may store the metadata as index entries associated with one or more pieces of content data. Further, a communication pathway such as a network path for the file partition or file server in which the content data is stored. Thus, user research criteria submitted to the database 216 as a query may result in the identification of all content matching submitted research criteria along with the network location of the identified data.

In some embodiments, content data 222 is the DICOM files, audio files, or video files. Patient records may be used to generate metadata for the content data, but are not considered content data themselves. In other implementations, all data related to the image files may be content data.

Content data 222 that is "copied" to a digital storage bin 214 may be the transmission of the exact file(s) into the receiving digital storage bin 214. Copying of content data 222 may also include pre-processing of images to remove patient identifying information or metadata that is not relevant to the research request of a querying user. Metadata of image files may be scrubbed, altered, appended to, or otherwise modified before during or after the transmission of the content data 222 to the digital storage bin 214. In some embodiments, the API service layer 212 may perform the "curating" or "cleaning" of content data or may instruct the gateway client application 224 to do so. Thus, content data 222 stored within the digital storage bins may be curated or modified to improve indexing and ease of metadata scanning. Content data that is described as being copied such be understood as being transferred in an unedited state or in a curated/modified state.

In some embodiments, the gateway client application 224 may receive access requests from an API service layer 212 (e.g., operating on virtual storage room server 120) of the virtual research room 210. In response to these requests, the gateway client application 224 may identify content data specified in the request and may facilitate transfer of the specified content data by a network layer of the computing device of the content owner. For example, the database 216 of the virtual research room 210 may store communication pathways indicated the file partition or file server in which content data 222 is stored within the computing device of the content owner 220, but the communication pathway may or may not provide specific file pathway information for content data elements. Thus, the API service layer 212 may use a communication pathway to identify the file partition or file server in which the requested content data is stored, but may require that the gateway client application access the specific file pathway of the requested content data.

Content data 222 that has been requested by the API service layer 212 may be transmitted by the computing device of the content owner to one or more digital storage bins (e.g., storage bin server 130). Digital storage bins 214 may be secure file directories or storage partitions dedicated to the temporary storage of the received content data 222. To protect the digital content rights of the content owner 220, each digital storage bin 214 may only be altered by the virtual research room 210 and/or the content owner 220. Users accessing the digital storage bin 214 and the content data maintained therein, have restricted permissions enabling only the viewing of the content data 222 and use of the data as input to executable analysis models. Upon completion of the user's access pf a digital storage bin 214, the content data is removed from the digital storage bin, thereby eliminating versions other than the version maintained by the content owner 220. In various embodiments, the gateway client application 224 and/or the API service layer 212 may maintain a log of users who have access content data and which content data has been accessed. This log may not include the nature of analysis performed on the accessed content data in order to ensure research privacy. The information contained in the log may be visible to content owners at their discretion.

Some embodiments may provide peer-to-peer transactions capabilities, which may leverage the log to enable peer-to-peer financial transactions associated with content data usage/access. For example, the virtual research platform 200 may provide a distributed marketplace enabling peer-to-peer collaboration, accountability, and transactions amongst and betwixt participants such as content owners and users. In such embodiments, content owners, users of data and service providers to both (recognizing participants may be any combination of these roles) will be able to use the virtual research platform 200 to conduct business with one another that is focused on the supply and us of content data for analytical research use. Like the log, peer-to-peer transactions may be implemented using blockchain or other distributed ledger technology to track and validate transactions.

Further, the peer-to-peer network may enable collaboration between users as well as between users and content owners. The output of execution of analysis models may be shared between participants, sold, or compared to results obtained by others. Such collaboration may enable users to compare results and alter or improve their research processes or analysis models. Further, the sharing of output results may reduce instances of redundant analysis model execution. For example, the output of executing common third-party analysis models on commonly requested content data sets may be purchased and shared amongst users, thereby reducing the need to run the analysis model on the content a data regularly. Blockchain or other ledger based technology may be used to train and maintain workflows between users. For example, physicians of distinct hospital networks may access a workflow associated with a patient in order to collaborate on review and diagnosis of patient conditions and to assess treatment options.

In some embodiments, each content owner 220 may be assigned to one or more digital storage bins at the time of enrollment in the virtual research platform, as needed, or at regular intervals. An asymmetric encryption key may be provided to the content owner via the gateway client application 224. The API service application 212 may issue encryption keys to each content owner. If a content owner wishes to terminate access to a chunk of content data being maintained in a digital storage bin or pause further computing to the storage bin, the content owner 220 may delete the encryption key from the computing device of the content owner 220. In some embodiments, the encryption key is provided by the API service layer 212 to the gateway client application 224 upon each new transfer of content data to a digital storage bin.

Users (e.g., user 160) may utilize a web application 230 or other client application installed on a client computing device to search the virtual research room 210 for content data and may perform research analysis on available content data. Users may be professors, students, research physicians, independent researchers, government entities, or others wishing to obtain access to large volumes of content data for use in analytical research. A user may provide the web application 230 with research criteria such as age and diagnosis ranges for desired content data. This research request is entered via a graphical user interface (GUI) of the web application as rendered in the user's web browser software, and may be transmitted by the computing device of the user to the virtual research room 210. The API service layer 212 may receive research requests and forward them to the database 216 for processing. A search result including selectable entries of matching content data available within the virtual research platform may be displayed in the web application 230. Content data selected by the user via the web application 230 is received by the API service layer 212, sent to the database for identification of associated communication pathways, and then sent to the gateway client application 224 to facilitate copying of the selected content data into a digital storage bin 214.

As is discussed in greater detail with reference to FIG. 3, the web application 230 may be used by the User to upload an analysis model. This analysis model is temporarily stored within the virtual research room 210 and is executed using the selected data, now stored within the digital storage bin, as input. The output of this execution or result may optionally, be stored in the database in association with the content data. The output is provided to the User, who may request and receive files containing the output information. But may not alter or otherwise manipulate the content data within the digital storage bin.

The virtual research platform 200 thus addresses the research community problem of obtaining sufficient data liquidity to enable large-scale data analysis. At the same time, the virtual research platform 200 protects the property interest that content owners and generators have in their data by preventing users of the content data from downloading, copying, or otherwise manipulating the content data. Thereby providing significant benefit to both users and content owners.

Figure 3:
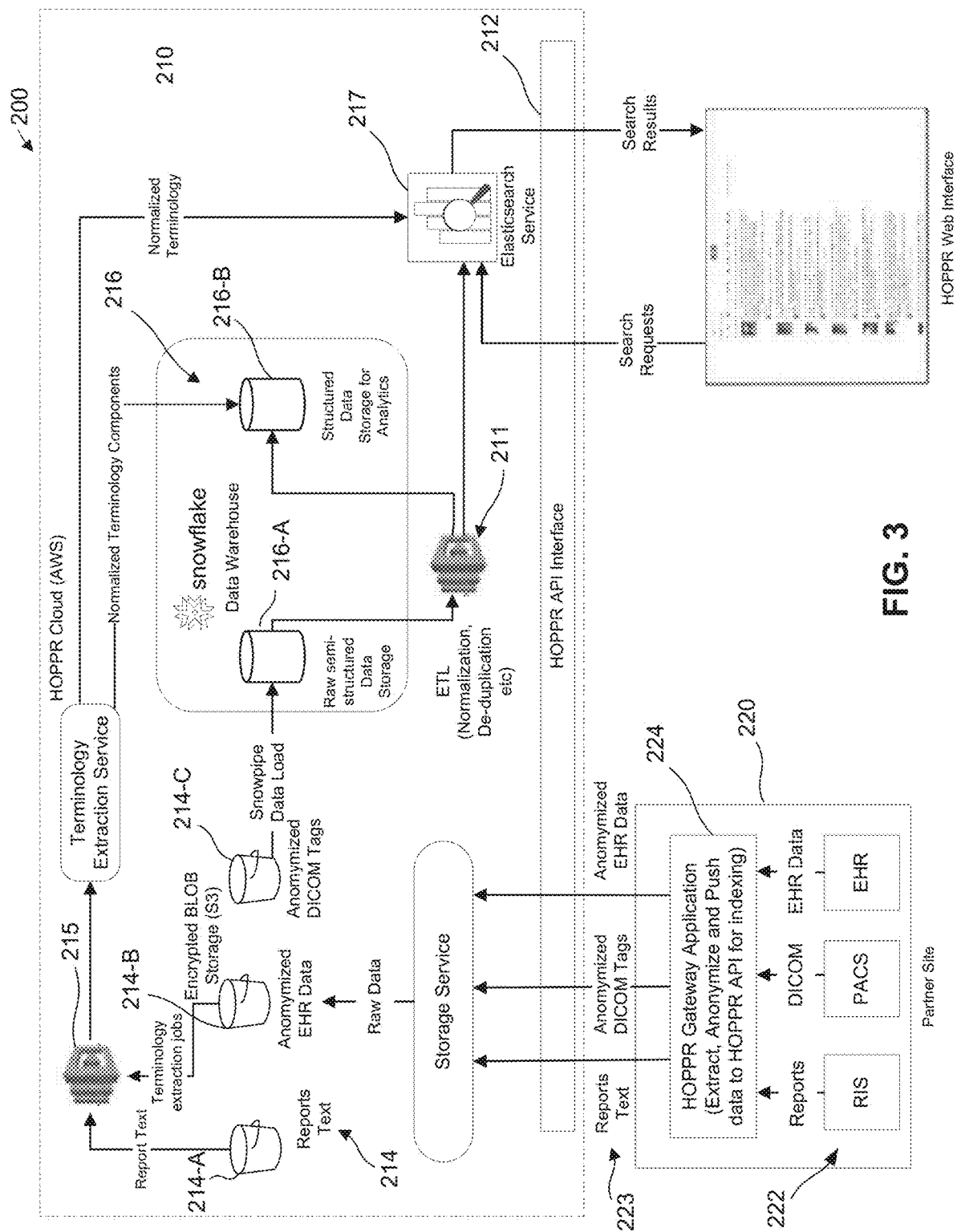
FIG. 3 is a block diagram of another embodiment of the virtual research platform.

FIG. 3 illustrates a block diagram of another embodiment of the virtual research platform 200. The virtual research platform 200 may include communications and file transfer between the computing device of a content owner (e.g., organization network 110) at a partner site and one or more servers of the cloud-based virtual research room (e.g., servers 120, 130, and 140). The various components of the virtual research room 210 of the virtual research platform 200 may accept content data metadata as input, receive and processes research queries, copy content data from a user to a digital storage bin, and provide a querying user with limited access to analyze the content data.

A computing device of a content owner 220 such as a hospital, university, phone company, physician's office, or entertainment content producer, may include one or more partitioned file directories or file servers for storing content data 222. In the illustrated example of a medical facility, content data may include medical images, e.g. Digital Images and Communications (DICOM) files that can be stored in a Picture Archiving and Communicating System (PACS), Electronic Health Record (EHR) files that can be stored in an EHR database, and other records related to the administration of a medical facility. In some embodiments, these other records can be stored in a Radiological Information System (RIS). In other examples, content data may include other types of images, audio samples, video files, and a variety of text data. This content data may be stored in a manner conventional to medical facility administration or may be stored in a secure partition to prevent cross-contamination of data.

A gateway client application 224 operating on the computing device of the content owner 220 provides an interface with the virtual research room 210. The gateway client application may monitor and track the content data 222 maintained by the content owner 220. The content owner 220 can, in some embodiments, be a source device as will be discussed in greater detail below.

In various embodiments, the gateway client application 224 may analyze the metadata of each file of the content data 222 and may provide the metadata information to the virtual research room 210 for addition to a database 216. Metadata information may include the type of image testing performed, a portion of the body imaged, demographic information, symptom reported, diagnosis, equipment used for imaging, date of testing, other forms of medical testing, test results, and the like. Because portions of this information, taken in combination may be patient-identifying, the virtual research platform 200 may scrub or otherwise anonymize a portion of the metadata for each image. Potentially patient identifying information may be scrubbed from the content data as it is transferred to the virtual research room 210 and a digital storage bin 214. The database 216 of the virtual research room 210 may store the metadata as index entries associated with one or more pieces of content data. Further, a communication pathway such as a network path for the file partition or file server in which the content data is stored. Thus, user research criteria submitted to the database 216 as a query may result in the identification of all content matching submitted research criteria along with the network location of the identified data.

In some embodiments, the gateway client application 224 can de-identify data before passing the data to the virtual research room 210. This can include the packetizing of one or several data files received by the gateway client application 224. In some embodiments, a data file can include metadata, a payload such as an image, test result, or the like, and a content file. In some embodiments, the content file can include text and/or narration characterizing patient attributes, conditions, and/or disease states as indicated in the payload of the data file and/or in the payloads of a plurality of data files. In some embodiments, the gateway client application 224 can be configured to identify and extract one or several portions from each of the metadata, the payload, and the content file. This extraction can be performed for a broad range of data, such as, for example, a portion of a picture including several pixels, and in some embodiments, the extraction can be repeatedly performed on a small portion of the data. In some embodiments, for example, each pixel of an image may include metadata that can comprise personal information. In some embodiments, the de-identifying of the data can include identifying a pixel, selecting the portion of the pixel's data not containing personal information, and extracting that information.

In some embodiments, the gateway client application 224 can generate a packet, and specifically can generate a first packet from the content file, generate a second packet from the metadata of the data file, and generate a third packet from the payload of the data file. In some embodiments, for each of these packets, the packetizing can include: identifying targeted portions of the respective source file (e.g. the payload, the metadata, or the content file), which targeted portions can be selected to exclude personalized data; and extract the targeted portions from the respective source file. In some embodiments, the extracting of the targeted portions de-identifies the extracted data. Specifically, the targeted data can be selected such that the extraction of the targeted data does not include any personalized data. Via this technique, de-identification occurs at the gateway client application 224, which in some embodiments, can be remote from the virtual research room 210, or more specifically, can be run on different hardware than the virtual research room 210. By performing this de-identification at the gateway client application 224, data packets received by the virtual research room 210 are already de-identified, and are completely de-identified.

Further, by performing this de-identification at the gateway client application 224, data sent from the source device 220 to the virtual research room 210 is de-identified and thus is not subject to harmful disclosure via interception of the data such as in, for example, a man-in-the-middle attack. Further, because the virtual research room 210 receive data packets that do not include any personalized data, any hacking of the virtual research room 210 will not result in the release of personalized data, as the virtual research room 210 does not include any personalized data. Finally, placing packetization at the gateway client application 224 before transmission to the virtual research room 210 improves efficiency of use of network resources and decreases transmission time for each data packet.

In some embodiments, content data 222 is the DICOM files, audio files, or video files. Patient records may be used to generate metadata for the content data, but are not considered content data themselves. In other implementations, all data related to the image files may be content data. Packetized content data 223 can be outputted by the gateway client application 224 and can be received by the virtual research room 210 via, for example, the API interface 212, also referred to herein as the API service layer 212.

Content data 222 and/or packetized content data 223 can be "copied" to a digital storage bin 214. This copying can include the transmission of the exact file(s) and/or packetized file(s) into the receiving digital storage bin 214. In some embodiments, this copying can be via the API service layer 212, which API service layer 212 may perform "curating" or "cleaning" of received data and/or may instruct the gateway client application 224 to do so. Thus, content data 222 stored within the digital storage bins may be curated or modified to improve indexing and ease of metadata scanning. Content data that is described as being copied such be understood as being transferred in an unedited state or in a curated/modified state.

In some embodiments, the packetized content data 223 can be received by the digital storage bin 214, which digital storage bin 214 can include multiple storage bins, also referred to herein as multiple databases. As shown in FIG. 3, the storage bin 214 can include a report storage bin 214-A, also referred to herein as a report database 214-A, an EHR storage bin 214-B, also referred to herein as an EHR database 214-B, and can include a payload storage bin 214-C, also referred to herein as a payload database 214-C. In some embodiments, the packetized content file data 223 can be received and sorted to the appropriate storage bin 214-A, 214-B, 214-C. Specifically, packetized content file data can be provide to the first storage bin 214-A, payload data can be provided to the third storage bin 214-C, and anonymized metadata can be provided to the EHR storage bin 214-B.

This packetized content data 223 can be channeled from the digital storage bin 214 to the database 216. Specifically, the content file data and the metadata can be channeled to tagging module 215 which can evaluate metadata and the content file data to generate tags and/or to generate supplemental tags for the payload. After evaluation to generate tags and/or supplemental tags, the generated tags and the associated packetized content data 223 can be stored in the database 216, and specifically in the structured database 216-B. In some embodiments, the generated tags and/or the associated packetized content data 223 can be made available to the search module 217, which search module can be used to identify content for use in training and/or evaluating an AI model. In some embodiments, the search module 217 can comprise an elastic search module.

The payload can be sent to the database 216, and specifically to a raw database 216-A. In some embodiments, the payload can be evaluated for tagging before being sent to the raw database 216-A. Alternatively, in some embodiments, the payload can be evaluated for tagging after being sent to the raw database 216-A. In some embodiments, an Extract, Transform, Load ("ETL") module 211 transfer items stored in the raw database 216-A to the structure database 216-B. This can include a normalization and/or de-duplication of the items in the raw database 216-A.

In some embodiments, the gateway client application 224 may receive access requests from an API service layer 212 (e.g., operating on virtual storage room server 120) of the virtual research room 210. In response to these requests, the gateway client application 224 may identify content data specified in the request and may facilitate transfer of the specified content data by a network layer of the computing device of the content owner. For example, the database 216 of the virtual research room 210 may store communication pathways indicating the file partition or file server in which content data 222 and/or packetized content data 221 is stored within the computing device of the content owner 220, but the communication pathway may or may not provide specific file pathway information for content data elements. Thus, the API service layer 212 may use a communication pathway to identify the file partition or file server in which the requested content data is stored, but may require that the gateway client application access the specific file pathway of the requested content data.

In some embodiments, content data 222 that has been requested by the API service layer 212 may be transmitted by the computing device of the content owner to one or more digital storage bins (e.g., storage bin server 130). In such an embodiment a content owner may be associated with a unique set of storage bins 214, including a unique first storage bin 214-A, a unique second storage bin 214-B, and a unique third storage bin 214-C. Digital storage bins 214 may be secure file directories or storage partitions dedicated to the temporary storage of the received content data 222. To protect the digital content rights of the content owner 220, each digital storage bin 214 may only be altered by the virtual research room 210 and/or the content owner 220. Users accessing the digital storage bin 214 and the content data maintained therein, have restricted permissions enabling only the viewing of the content data 222 and use of the data as input to executable analysis models. Upon completion of the user's access pf a digital storage bin 14, the content data is removed from the digital storage bin, thereby eliminating versions other than the version maintained by the content owner 220. In various embodiments, the gateway client application 224 and/or the API service layer 212 may maintain a log of users who have access content data and which content data has been accessed. This log may not include the nature of analysis performed on the accessed content data in order to ensure research privacy. The information contained in the log may be visible to content owners at their discretion.

Some embodiments may provide peer-to-peer transactions capabilities, which may leverage the log to enable peer-to-peer financial transactions associated with content data usage/access. For example, the virtual research platform 200 may provide a distributed marketplace enabling peer-to-peer collaboration, accountability, and transactions amongst and betwixt participants such as content owners and users. In such embodiments, content owners, users of data and service providers to both (recognizing participants may be any combination of these roles) will be able to use the virtual research platform 200 to conduct business with one another that is focused on the supply and us of content data for analytical research use. Like the log, peer-to-peer transactions may be implemented using blockchain or other distributed ledger technology to track and validate transactions.

Further, the peer-to-peer network may enable collaboration between users as well as between users and content owners. The output of execution of analysis models may be shared between participants, sold, or compared to results obtained by others. Such collaboration may enable users to compare results and alter or improve their research processes or analysis models. Further, the sharing of output results may reduce instances of redundant analysis model execution. For example, the output of executing common third-party analysis models on commonly requested content data sets may be purchased and shared amongst users, thereby reducing the need to run the analysis model on the content a data regularly. Blockchain or other ledger based technology may be used to train and maintain workflows between users. For example, physicians of distinct hospital networks may access a workflow associated with a patient in order to collaborate on review and diagnosis of patient conditions and to assess treatment options.

In some embodiments, each content owner 220 may be assigned to one or more digital storage bins at the time of enrollment in the virtual research platform, as needed, or at regular intervals. An asymmetric encryption key may be provided to the content owner via the gateway client application 224. The API service application 212 may issue encryption keys to each content owner. If a content owner wishes to terminate access to a chunk of content data being maintained in a digital storage bin or pause further computing to the storage bin, the content owner 220 may delete the encryption key from the computing device of the content owner 220. In some embodiments, the encryption key is provided by the API service layer 212 to the gateway client application 224 upon each new transfer of content data to a digital storage bin.

Users (e.g., user 160) may utilize a web application 230 or other client application installed on a client computing device to search the virtual research room 210 for content data and may perform research analysis on available content data. Users may be professors, students, research physicians, independent researchers, government entities, or others wishing to obtain access to large volumes of content data for use in analytical research. A user may provide the web application 230 with research criteria such as age and diagnosis ranges for desired content data. This research request is entered via a graphical user interface (GUI) of the web application as rendered in the user's web browser software, and may be transmitted by the computing device of the user to the virtual research room 210. The API service layer 212 may receive research requests and forward them to the database 216 for processing. A search result including selectable entries of matching content data available within the virtual research platform may be displayed in the web application 230. Content data selected by the user via the web application 230 is received by the API service layer 212, sent to the database for identification of associated communication pathways, and then sent to the gateway client application 224 to facilitate copying of the selected content data into a digital storage bin 214.

As is discussed in greater detail with reference to FIG. 4, the web application 230 may be used by the User to upload an analysis model. This analysis model is temporarily stored within the virtual research room 210 and is executed using the selected data, now stored within the digital storage bin, as input. The output of this execution or result may optionally, be stored in the database in association with the content data. The output is provided to the User, who may request and receive files containing the output information. But may not alter or otherwise manipulate the content data within the digital storage bin.

The virtual research platform 200 thus addresses the research community problem of obtaining sufficient data liquidity to enable large-scale data analysis. At the same time, the virtual research platform 200 protects the property interest that content owners and generators have in their data by preventing users of the content data from downloading, copying, or otherwise manipulating the content data. Thereby providing significant benefit to both users and content owners.

Figure 4:
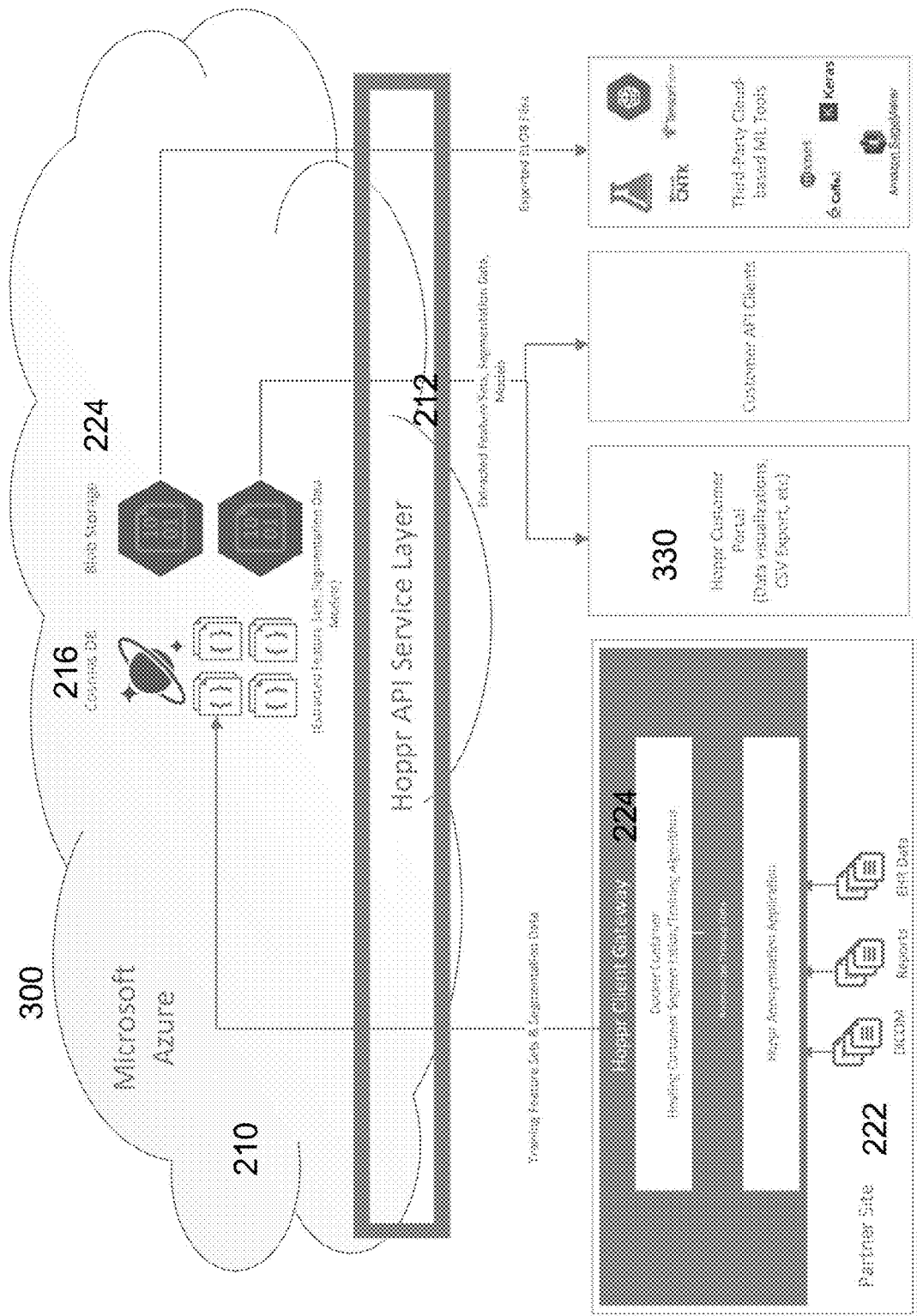
FIG. 4 is a block diagram of a machine learning model execution platform of virtual research platform, according to various embodiments.

FIG. 4 illustrates a block diagram of a machine learning model execution platform of virtual research room. With reference to FIGS. 1-4, a server of the virtual research room 210 may accept user analytical models and run data analysis on selected content data. Users may provide their own custom analysis models or may use third-party preloaded models according to the user's research needs.

API service layer 212 may receive analysis models from the computing device of a user (e.g., user 160). The use may generate an analysis model such as a machine learning model and store the model locally. For example, the analysis model may be trained using smaller data sets available to the user. The analysis model is a research model that the user would like the virtual research room 210 to execute using the selected content data as input.

The user may upload the analysis model via a user interface such as the web application 230 or other client software application. The web application may enable file selection and upload, and may also provide a variety of tools for viewing and organizing the results of an analysis model execution, such as data visualization tools. The uploaded analysis model may be temporarily stored by the virtual research room 210 such as in digital storage server 130. In some embodiments, uploaded analysis models may be added to a batch analysis execution queue and executed in the order received, as resources become available. Big data analytics is often resource intensive, making it difficult to run numerous instances of analysis simultaneously. For this reason, all requests for execution of an analysis model (i.e., the upload of an analysis model by a user) may be queue and executed as system resources become available.

Content data may consumer large amounts of storage space and thus may not be copied from various content owners (e.g., content owner 220) until the analysis model execution request reaches the top, or near the top, of the batch execution queue. The API service layer 212 and the gateway client application 224 may communicate to transfer the selected content data to the digital storage bin as the analysis model reaches the top of the batch execution queue.

The output of the execution of the analysis model may be stored in the database 216 in association with the content data. Such storage may be temporary or on-going. The output is also provided to the requesting user in a format of his/her choosing. The user may download the output to the user's computing device, but may not download the content data within the digital storage bin. In the event that a third-party analysis model is employed by the user, the virtual research room 210 may provide the third-party with information about the output of the execution.

This technique of enabling virtual analytical research allows users to perform big data analytics research without needing to free up computing resources to storage the content data locally or run the analysis algorithm on network computing devices. The virtual research platform 200 may thus may large-scale analytical research more accessible to small and independent researchers.

Figure 5:
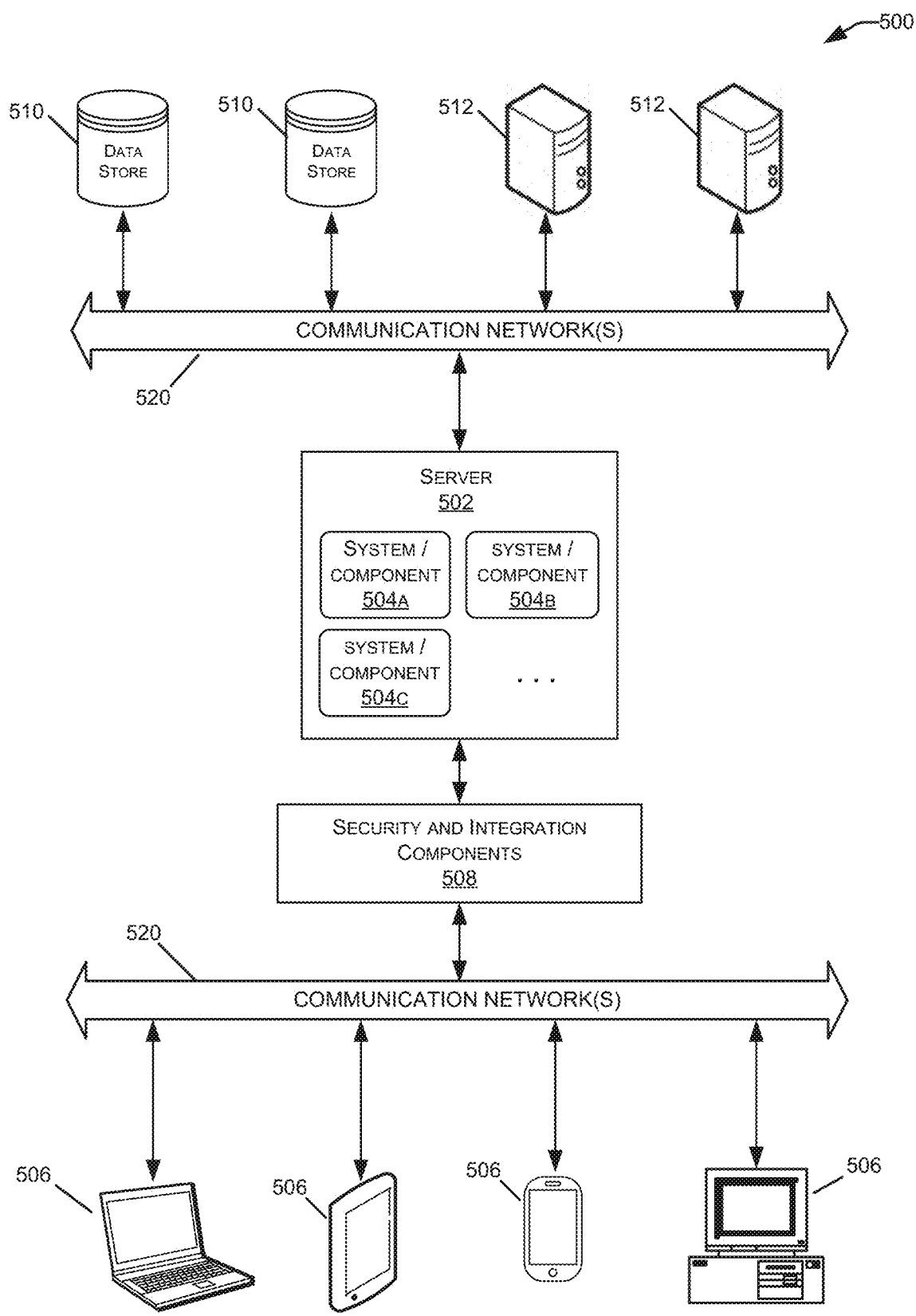
FIG. 5 is a schematic illustration of one illustrative embodiment of a distributed computing environment.

With reference to FIG. 5, an illustrative distributed computing environment 500 is shown including a computer server 502, four client computing devices 506, and other components that may implement certain embodiments and features described herein. In some embodiments, the server 502 may correspond to the virtual research room server 120 and/or to the storage bin server 130 discussed above in FIG. 1, and the client computing devices 506 may correspond to the devices used by, for example, the first user 150 and/or the second user 160. However, the computing environment 500 illustrated in FIG. 5 may correspond to any other combination of devices and servers configured to implement a client-server model or other distributed computing architecture.

Client devices 506 may be configured to receive and execute client applications over one or more networks 520. Such client applications may be web browser based applications and/or standalone software applications, such as mobile device applications. Server 502 may be communicatively coupled with the client devices 506 via one or more communication networks 520. Client devices 506 may receive client applications from server 502 or from other application providers (e.g., public or private application stores). Server 502 may be configured to run one or more server software applications or services, for example, web-based or cloud-based services, to support content distribution and interaction with client devices 506. Users operating client devices 206 may in turn utilize one or more client applications (e.g., virtual client applications) to interact with server 502 to utilize the services provided by these components.

Various different subsystems and/or components 504 may be implemented on server 502. Users operating the client devices 506 may initiate one or more client applications to use services provided by these subsystems and components. The subsystems and components within the server 502 and client devices 506 may be implemented in hardware, firmware, software, or combinations thereof. Various different system configurations are possible in different distributed computing systems 500 and content distribution networks 100. The embodiment shown in FIG. 5 is thus one example of a distributed computing system and is not intended to be limiting.

Although exemplary computing environment 500 is shown with four client computing devices 506, any number of client computing devices may be supported. Other devices, such as specialized sensor devices, etc., may interact with client devices 506 and/or server 502.

As shown in FIG. 5, various security and integration components 508 may be used to send and manage communications between the server 502 and user devices 506 over one or more communication networks 520. The security and integration components 508 may include separate servers, such as web servers and/or authentication servers, and/or specialized networking components, such as firewalls, routers, gateways, load balancers, and the like. In some cases, the security and integration components 508 may correspond to a set of dedicated hardware and/or software operating at the same physical location and under the control of the same entities as server 502. For example, components 508 may include one or more dedicated web servers and network hardware in a datacenter or a cloud infrastructure. In other examples, the security and integration components 508 may correspond to separate hardware and software components which may be operated at a separate physical location and/or by a separate entity.

Security and integration components 508 may implement various security features for data transmission and storage, such as authenticating users and restricting access to unknown or unauthorized users. In various implementations, security and integration components 508 may provide, for example, a file-based integration scheme or a service-based integration scheme for transmitting data between the various devices in the content distribution network 100. Security and integration components 508 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 508 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 502 and user devices 506. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 508 may include specialized hardware for providing secure web services. For example, security and integration components 508 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 520 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 520 may be local area networks (LAN), such as one based on Ethernet, Token-Ring and/or the like. Network(s) 520 also may be wide-area networks, such as the Internet. Networks 520 may include telecommunication networks such as public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 520.

Computing environment 500 also may include one or more data stores 510 and/or back-end servers 512. In certain examples, the data stores 510 may correspond to any database or memory discussed above in FIG. 1, and back-end servers 512 may correspond to the various back-end servers 120, 130. Data stores 510 and servers 512 may reside in the same datacenter or may operate at a remote location from server 502. In some cases, one or more data stores 510 may reside on a non-transitory storage medium within the server 502. Other data stores 510 and back-end servers 512 may be remote from server 502 and configured to communicate with server 502 via one or more networks 520. In certain embodiments, data stores 510 and back-end servers 512 may reside in a storage-area network (SAN), or may use storage-as-a-service (STaaS) architectural model.

Figure 6:
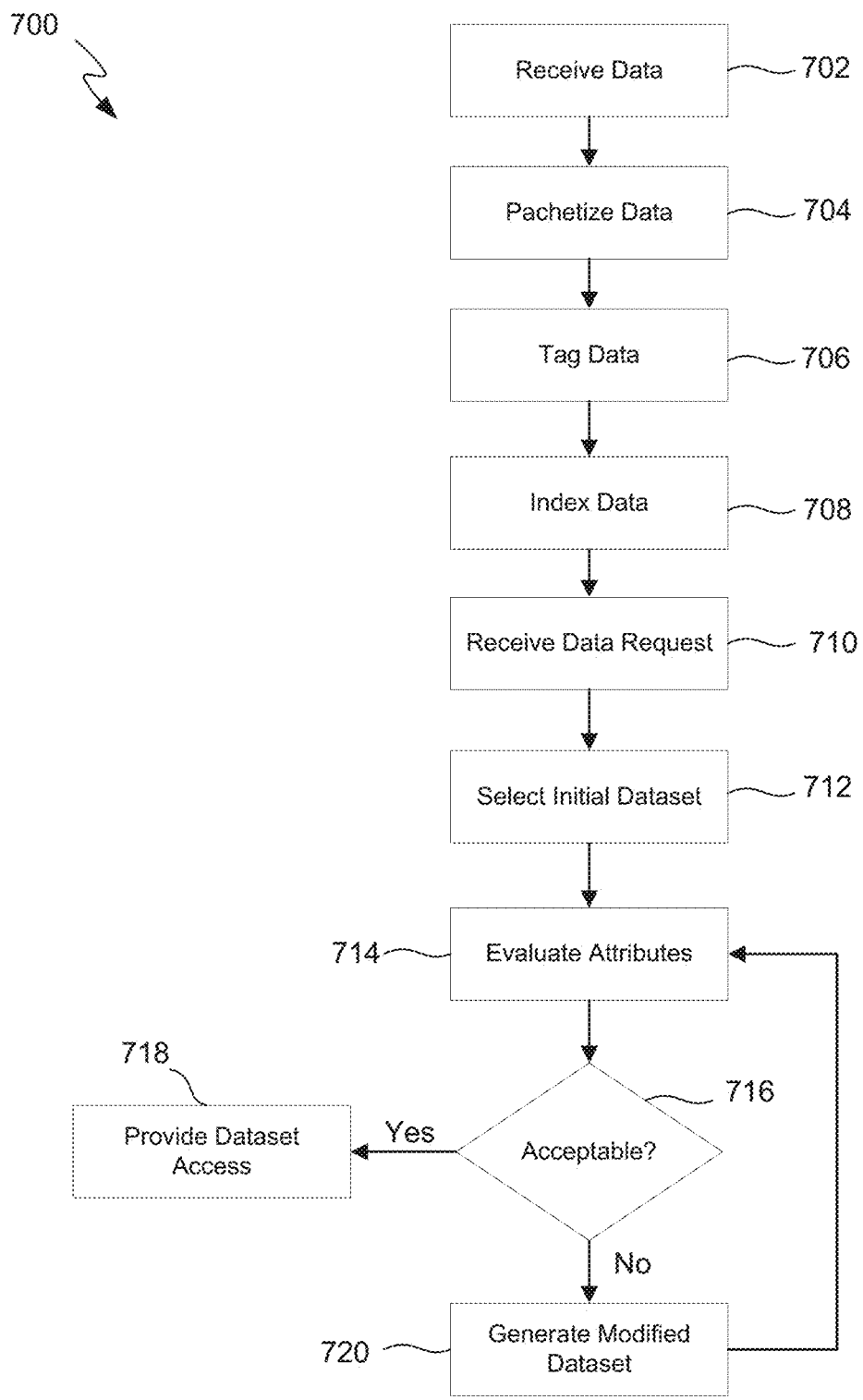
FIG. 6 is a flowchart illustrating one embodiment of a process for automated data curation and presentation.

With reference now to FIG. 6, a flowchart illustrating one embodiment of a process 700 for automated data curation and presentation is shown. The process 700 can be performed by all or portions of the system as discussed above in FIGS. 1-5. The process 700 begins at block 702, wherein data is received. In some embodiments, the data can include the content data, and can be received by the gateway client application 224 which can be located on a device of the content owner 220 and/or that of the virtual research platform 200. The content data can include, for example, one or more of: a payload; metadata; and a content file.

In some embodiments, the step of block 702 can include the receipt of content data from a plurality of sources. In some embodiments, for example, the step of block 702 can include the receipt of data from one or more of: a first source; a second source; a third source; and/or any other number of sources.

At block 704, the received data is packetized. This packetization can be performed by the gateway client application 224 as discussed above. In some embodiments, packetizing of the content data can include: identifying targeted portions of at least the payload and the content file, which targeted portions can be selected to exclude personalized data; and extracting the targeted portions from the data file. In some embodiments, extracting the targeted portions from the data file includes the de-identification of those targeted portions.

The packetized content data can be provided to the digital storage bin 214. All or portions of the packetized content data can be passed to the tagging module 215. As indicated in block 706, the tagging module can tag the packetized content data received by the tagging module 215. In some embodiments, the tagging module 215 can, for example, automatically generate at least one tag for the packetized content data. In some embodiments, the at least one tag can be automatically generated based on at least one key phrase identified in at least the targeted portion of the content data.

At block 708, the tagged content data can be indexed. In some embodiments, this indexing can be performed by the ETL module 211. In some embodiments, the tagged content data can be indexed according to the at least one tag, and the tagged content data can be tagged into a predetermined taxonomy. This predetermined taxonomy can be, for example, a taxonomy of health conditions such as a taxonomy used to manage payment for medical services.

At block 710, a data request is received. In some embodiments, the data request can be received via the API 212 and/or via the search module 217. In some embodiments, the data request can include a plurality of parameters identifying attributes the desired data, these attributes can include, for example, one or several boundaries for the desired data such as a minimum number of pieces of data and/or content of the desired data such as relevance of the desired data to one or several conditions, disease states, diagnoses, or the like. In some embodiments, these parameters can identify one or several tags for identifying the desired data. In some embodiments, parameters requested can be stored by the virtual research platform 200, and specifically by the virtual research room server 120 and/or the storage bin server 130. In some embodiments, these stored parameters can be used to improve the taxonomy. Namely, in the event that one or several parameters do not correspond to aspects of the taxonomy, then these one or several parameters can be used to update the taxonomy and specifically can be used in the creation of one or several new categories in the taxonomy.

At block 712, an initial dataset is selected. This initial dataset can be selected by the search module 217 in response to the received data request. This dataset can be evaluated as indicated in block 714. In some embodiments, this can include evaluation of the attributes of the dataset. This evaluation can include determining if the returned dataset meets minimum size of the desired dataset. In some embodiments, this evaluation can include determining if the dataset is too large. In some embodiments, this can include determining if the dataset includes a number of pieces of data that is greater than a threshold number of times larger than the specified minimum, determining if the number of pieces in the dataset is larger than a maximum number, determining if the size of the dataset in units of memory such as megabytes or gigabytes is greater than a maximum number, or the like.

In some embodiments, this evaluation of the dataset can further include evaluation of the dataset for heterogeneity. A dataset that is too homogenous may increase the likelihood of overtraining. To prevent overtraining, the dataset can be evaluated for heterogeneity. This can include, for example, determining if the dataset originates from at least a desired number of distinct source devices, is generated by at least desired number of different source machines, is generated by at least a desired number of different tests, is desired by at least a minimum number of practitioners, or the like. In some embodiments, this determination can be made based off of metadata associated with the content data.

At decision step 716, it is determined if the dataset is acceptable. In some embodiments, this determination is based on the evaluation of block 714. In some embodiments, for example, the dataset is acceptable when the dataset is greater than a minimum size and less than a maximum size. In some embodiments, the dataset is acceptable when the dataset has at least a minimum heterogeneity. If it is determined that the dataset is acceptable, then the process 700 proceeds to block 718, and the dataset is provided. In some embodiments, the providing of the dataset is the delivering of curated data selected according to at least some of the parameters of the data request. In some embodiments, the dataset can be provided to the API service layer 212 and/or to a device outside of the virtual research platform 200.

Returning again to decision step 716, if it is determined that the dataset is unacceptable, then the process 700 proceeds to block 720, wherein a modified dataset is generated. In some embodiments, the modified dataset can be generated to remedy the deficiency in the dataset identified in decision step 716. The modified dataset can be generated by the search module 217. In some embodiments, this can include expanding the dataset if the minimum threshold was not achieved, shrinking the dataset if the maximum threshold was achieved, increasing dataset heterogeneity if the dataset is to homogenous, or the like. In some embodiments, this can include interaction with the user requesting the data for further parameters defining the dataset to either narrow or expand the search. After the modified dataset has been generated, the process 700 returns to block 714 and continues as outlined above.

Figure 7:
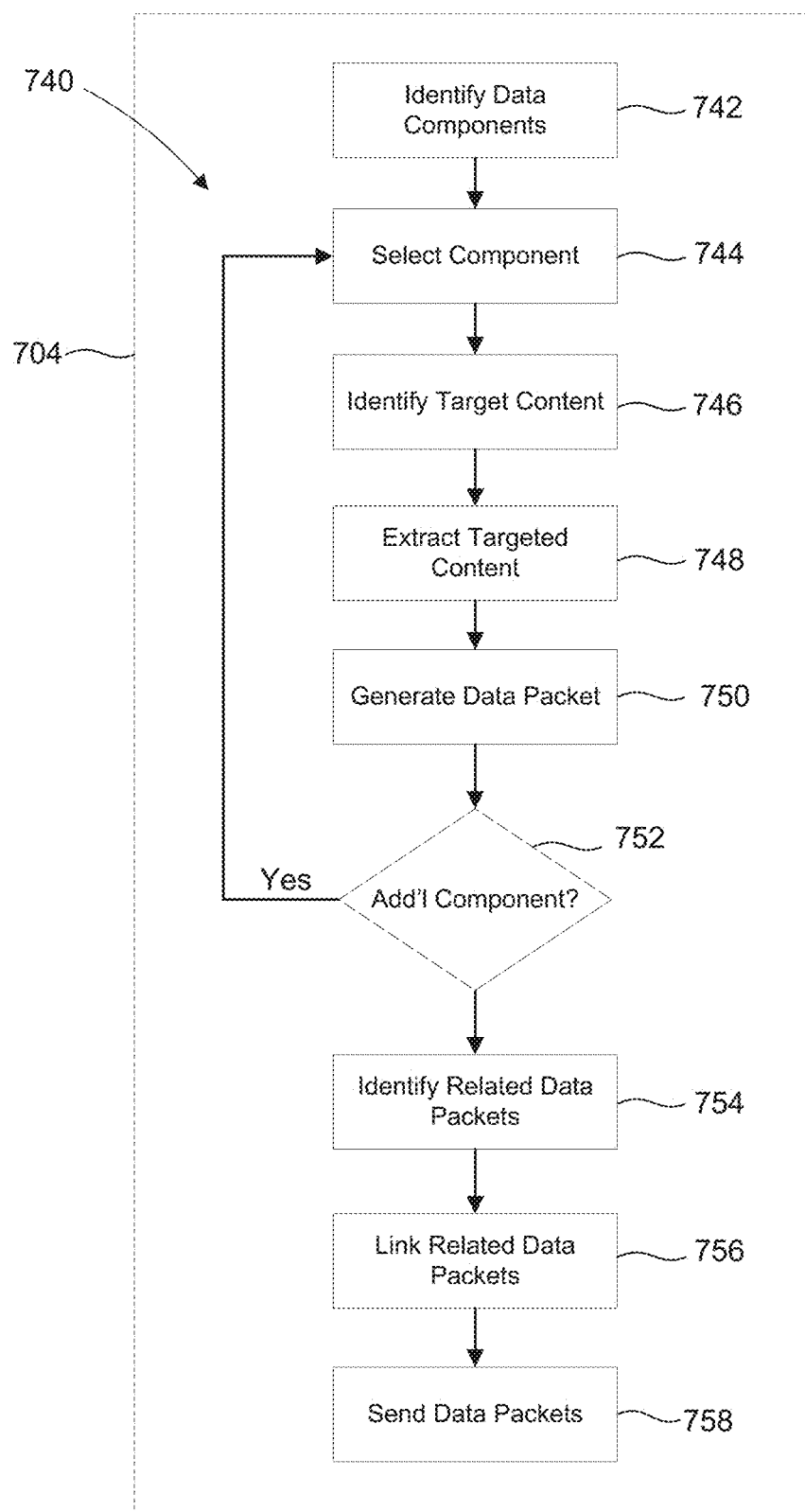
FIG. 7 is a flowchart illustrating one embodiment of a process for data packetization.

With reference now to FIG. 7, a flowchart illustrating one embodiment of a process 740 for data packetization is shown. The process 740 can be performed as a part of, or in the place of the step of block 704 of FIG. 6. The process 740 begins at block 742, wherein the data components for a piece of content data are identified. In some embodiments, this can include identifying the payload, the metadata, and the content file. These pieces of the content data can be identified by the gateway client application 224. In some embodiments, these pieces of the content data file are horizontally linked in that they relate to a common, shared event, visit, appointment, test, or the like. For example, horizontally linked pieces of the content data can include the image generated by an x-ray machine, the metadata relating to that image and the generation of that image, and the content file containing information relating to that image and the contents of that image. In contrast to horizontally linked pieces of the content data file, all or portions of the content data filed can be vertically linked. As used herein, content data is vertically linked when it relates to the same patient, but relates to different tests, visits, or the like. In some embodiments, identifying data components can include identifying horizontally linked data components and/or identifying vertically linked content data.

After the data components of the piece of content data have been identified, the process 740 proceeds to block 744, wherein one of the identified data components is selected. This can include selecting, for example, one of the metadata, content file, and payload. After the one of the data components has been selected, the process 740 proceeds to block 746, wherein targeted content is identified. In some embodiments, this targeted content can comprise the portion of the content data useful in evaluation with a machine learning model. For example, the payload may contain image data. The targeted content may be portions of the payload containing image data, portions of the metadata identifying one or several attributes of the image such as image size, quality, location of creation, and/or machine used in the creation of the image, and/or portions of the content file identifying the medical condition, state, and/or diagnosis for the image. In some embodiments, non-targeted information can include any content that is or contains personal information. In some embodiments, the targeted content changes based on, for example, the type of payload, the creation of the payload including the clinic at which the payload was created or the machine with which the payload was created, or the like. In some embodiments, the gateway client application 224 can contain a database of categories of content data and identification of targeted content for the same. In some embodiments, identifying targeted data can include identifying the type of payload, and retrieving targeted content information from the database based on the type of payload. In other embodiments, identifying the targeted content can include identifying personalized data in the content data and identifying the portions of the content data not including personalized data as the target data. In some embodiments, separating the targeted and personalized data can be simple as the personalized data may be only located in a few discrete portions of the content data. In other embodiments, the separation of personalized data and targeted can be rigorous such as, for example instances in which image pixel data includes personalized data. In such instances, targeted data is defined with respect to each pixel of image data.

After the targeted content has been identified, the process 740 proceeds to block 748, wherein the targeted data is extracted. The targeted data can be extracted via an ETL process performed by the gateway client application. The extracted target data can be formed into a packet as indicated in block 750. In some embodiments, packetizing the data file can include: generating a first packet from the content file; generating a second packet from the metadata of the data file; and generating a third packet from the payload of the data file. Thus, as shown at decision state 752 in FIG. 7, it is determined if the content data has an additional component. In other words, it is determined if a data packet has already been generated for each of the payload, the metadata, and the content file. If one of these packets has not yet been generated, then it is determined that the content data has an additional component and the process 740 returns to block 744 and continues as outlined above. Alternatively, if it is determined that there is not an additional component, then the process 740 proceeds. At block 754 one or several related data packets are identified. These related data packets can include horizontally linked data packets or vertically linked data packets.

After any related data packets are identified, the process 740 proceeds to block 756, wherein the related data packets are linked. In some embodiments, this linking information is included in the related data packets, and in some embodiments, this linking information is associated with the related data packets. At block 758, the data packets are sent. In some embodiments, the data packets can be sent by the gateway client application 224 to the storage service, which storage service can then identify relevant storage bins for the data packets and can stored data packets in the relevant storage bins. In some embodiments, the linked data packets can be transmitted from the gateway client application to an indexing server and specifically to the storage service running on the virtual research room server 120 and/or on the storage bin server 130.

In some embodiments, the linking of the related data packets provides a significant technical improvement over previous systems. As discussed above, the extraction of target content greatly improves the protection of personalized data. However, this extraction of target content removes the ability of the system to link content data and study changes in the target data over time. By, in some embodiments, identifying related data packets and/or related content data with the gateway client application 224 and then linking these related data packets, personalized data is protected, but relevant data packets are linked and changes in the target data over time are discernable. Further, this linking of related data packets improves the effectiveness of automatic tagging of the data packets as will be discussed at further length below.

Figure 8:
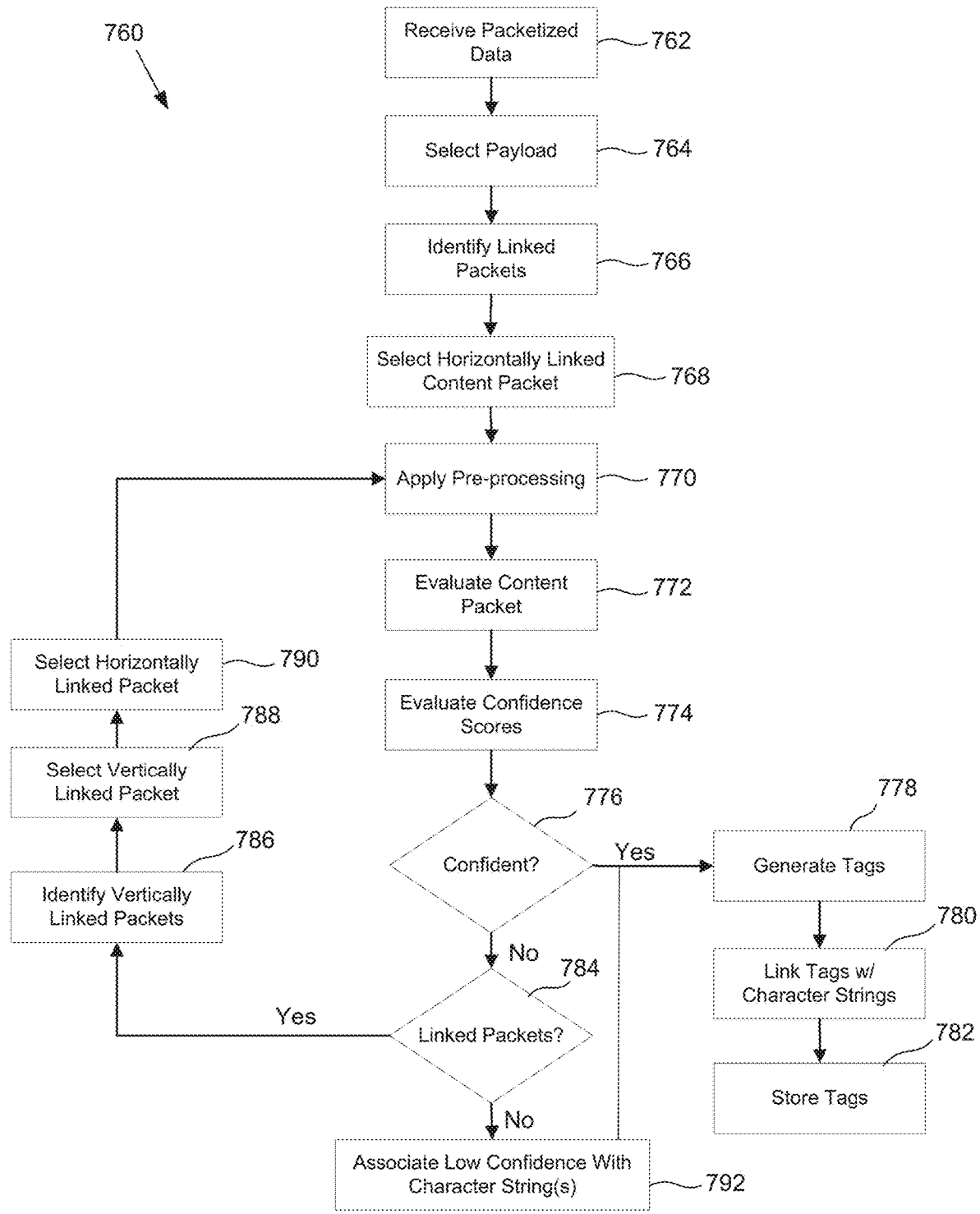
FIG. 8 is a flowchart illustrating one embodiment of a process for tagging.

With reference now to FIG. 8, a flowchart illustrating one embodiment of a process 760 for tagging is shown. The process 760 can be performed as a part of, or in the place of block 706 of FIG. 6. In some embodiments, the process 760 can be performed by the virtual research platform 200. The process 760 begins at block 762, wherein packetized data is received. In some embodiments, the packetized data can be received from the gateway client application 224 and can be received by the API service layer 212 and/or the storage service. The packetized data can be sorted into the storage bin 214. In some embodiments, the first packet can be stored in a first database—in other words, in the first storage bin 214-A, the second packet can be stored in a second database—in other words, in the second storage bin 214-B, and the third packet can be stored in a third database—in other words, in the third storage bin 214-C.

At block 764, a packetized payload is selected. This packetized payload can be selected from the third storage bin 214-C. After the packetized payload is selected, the process 760 proceeds to block 766 wherein any linked packets are identified. In some embodiments this can include identifying one or several linked horizontal data packets and/or one or several linked vertical data packets. In normal operation, a packetized payload will be linked with one or several horizontal data packets, and specifically with a metadata packet and a content file packet. As indicated at block 768 a horizontally linked content file packet is selected from the identified linked packets. In some embodiments, this content file packet comprises text describing the contents of the payload and/or the medical condition, diagnosis, disease state, or the like evidenced by the payload.

At block 770, pre-processing is applied to the selected content file packet. In some embodiments, this preprocessing can include adjusting one or several attributes of the content file packet such as, for example, contrast, brightness, sharpness, or the like, and/or in some embodiments, this preprocessing can include converting text and/or character strings in the content file packet into computer readable form. In some embodiments, the preprocessing can further include harmonization of terms within the content file packet and/or negation processing of the content file packet. In some embodiment, the harmonization of terms can include identification of one or several terms in the content file packet, determination of whether some or all of the identified one or several terms has any relevant synonyms, and linking the relevant synonyms to terms in the one or several terms having one or several relevant synonyms. In some embodiments, negation processing can include identifying words or phrases within the content file packet that indicate a negative and storing an indication of this negative in connection with any associated word(s) or phrase(s).

At block 772, the content file packet is evaluated. In some embodiments, this can include applying one or several computer-based text analysis algorithms and/or processes to the content file packet. In some embodiments, this can include ingesting all or portions of the content file packet into a Natural Language Processing (NLP) model that can be a machine learning model trained for NLP. In some embodiments, the evaluation of the content file packet can include: parsing the content file packet, identifying character strings within the content file packet; generating an evidence score for each of the identified character strings; and linking the generated evidence score to the character string for which the evidence score was generated. Further details of this evaluation will be discussed at greater length below.

After the content file packet has been evaluated, the process 760 proceeds to step 774, wherein the generated confidence scores, also referred to herein as evidence scores, are evaluated. In some embodiments, this can include selecting a character string and its associated evidence score and comparing the evidence score to a threshold. At decision state 776, it is determined if the confidence scores are sufficient. If the confidence score meets and/or exceeds the threshold and/or is sufficient, then the process 760 proceeds to block 778, wherein tags are generated. In some embodiments, one or several tags may be associated with each character string and its associated evidence score. Thus, in an embodiment having a plurality of character strings, at least one tag may be associated each of some or all of the plurality of character strings.

After the tags are generated, the process 760 proceeds to block 780, wherein the generated tags are linked with their associated character string. In some embodiments, this linking between tags and their associated character string can be stored in the database 216, and specifically in the structured database 216-B as shown in block 782. In some embodiments, the steps of block 778 through 782 can be performed by the tagging module virtual research platform 200.

Returning again to decision step 776, if it is determined that the confidence level is not sufficient, then the process 760 proceeds to decision step 784, wherein it is determined if there are any vertically linked packets. In some embodiments, this determination can be based on the identification of linked packets performed in step 766. If it is determined that there are linked vertical packets, then the process 760 proceeds to block 786 and identifies the vertically linked packets. In some embodiments, these vertically linked packets represent data relevant to the patient associated with the payload selected in block 764. These vertically linked packets contain information relating to results one or several other tests or procedures. These one or several other tests or procedures can be performed at the same or at a different time and/or at the same or a different location.

Once the vertically linked packets are identified, one of the vertically linked packets is selected as indicated at block 788. In some embodiments, when the selected vertically linked packet is a payload packet or a metadata packet, then horizontally linked packets are identified and selected, and specifically, the horizontally linked content file packet is identified and selected. After the horizontally linked packet is identified and selected, the process 760 returns to block 770 and proceeds as outlined above. In some embodiments, through the identification and analysis of vertically linked data packets, additional data can be gathered which can affect the confidence score. In some embodiments, for example, when a diagnosis of a condition cannot be made based on a payload, reference to other test results—or in other words, evaluation of data packets relevant to other tests, visits, or procedures—may allow diagnosis of the medical condition. In such an embodiment, evaluation of the payload selected in block 764 and horizontally linked packets may be insufficient to generate tags, however, reference to these vertically linked data packets may increase the confidence score sufficiently to allow tagging. In such an embodiment, the confidence score of the first data packet is modified based on the evaluation of one or several vertically linked data packets.

Returning again to decision state 784, if it is determined that there are no linked vertical packets, then the low confidence score is linked with the associated character string, and the process proceeds to blocks 778 through 782 wherein tags are generated and stored.

Figure 9:
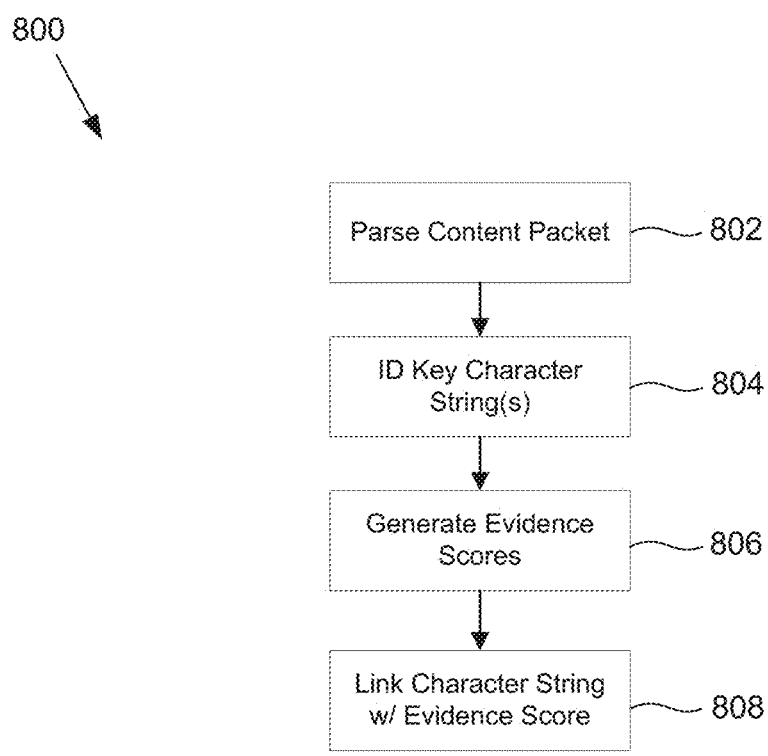
FIG. 9 is a flowchart illustrating one embodiment of a process 800 for evaluation of a data packet.

With reference now to FIG. 9, a flowchart illustrating one embodiment of a process 800 for evaluation of a data packet is shown. The process 800 can be performed as a part of, or in the place of the step of block 772 of FIG. 8. The process 800 begins at block 802, wherein the content packet is parsed. In some embodiments, the content packet can be parsed to identify grammatical structures within the text and/or character strings in the content packet. The content packet can be parsed to identify one or several words, phrases, and/or parts of speech. In some embodiments, the content packet can be parsed by ingesting all or portions of the text of character strings in the content packet into a machine learning model trained to parse the text.

After the content packet has been parsed, the process 800 proceeds to block 804, wherein character strings are identified and/or selected. In some embodiments, this can include the selection of one or several words or phrases outputted by the parsing of the content packet. After one or several words or phrases are identified and/or selected, an evidence score is generated for each of the one or several words or phrases. In some embodiments, the generation of the evidence score can reflect the confidence that words or phrases generated by the parsing accurately reflect the meaning of all or portions of the content packet. After the evidence scores are generated, the process 800 proceeds to block 808, wherein each character string, or in other words, the words and/or phrases generated by the parsing of the content packet are linked with their evidence score.

Figure 10:
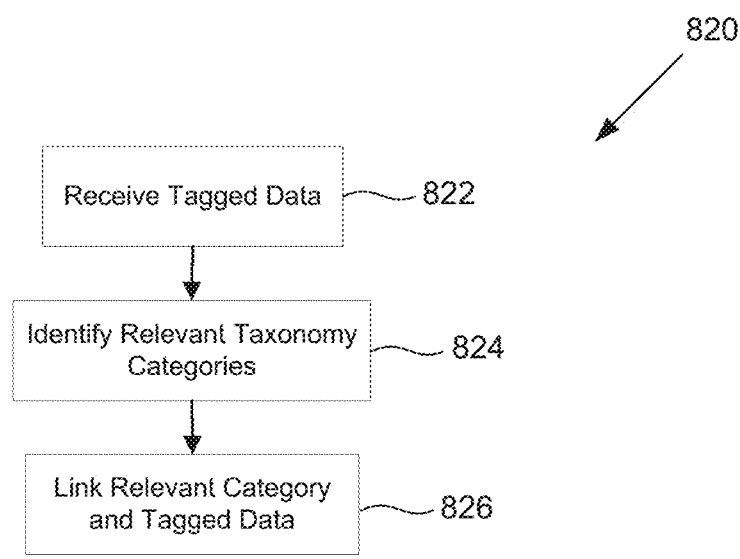
FIG. 10 is a flowchart illustrating one embodiment of a process for indexing the tagged content data.

With reference now to FIG. 10, a flowchart illustrating one embodiment of a process 820 for indexing the tagged content data is shown. The process 820 can be performed as a part of, or in the place of the step of block 708 of FIG. 6. The process 820 can be performed by all or portions of the virtual research platform 200. The process 820 begins at block 822, wherein tagged data is received. In some embodiments, the tagged data can be received from the tagging module 215. In some embodiments, the tagged data can be received by the virtual research room server 120.

Based on the received tagged data, one or several relevant categories of a taxonomy can be identified as indicated in block 824. In some embodiments, the tags can correspond to categories in the taxonomy, and identifying the relevant taxonomy categories can comprise identifying the taxonomy category specified by the tags. After the taxonomy categories have been identified, the process 820 proceeds to block 826, wherein the tags are linked with their relevant category in the taxonomy. In some embodiments, this can include storing the tagged data packet in the database 216, and specifically in the structured database 216-B, and adding a pointer in the database 216, the pointer pointing from the tag and/or the data packet to the matching category of the taxonomy.

Figure 11:
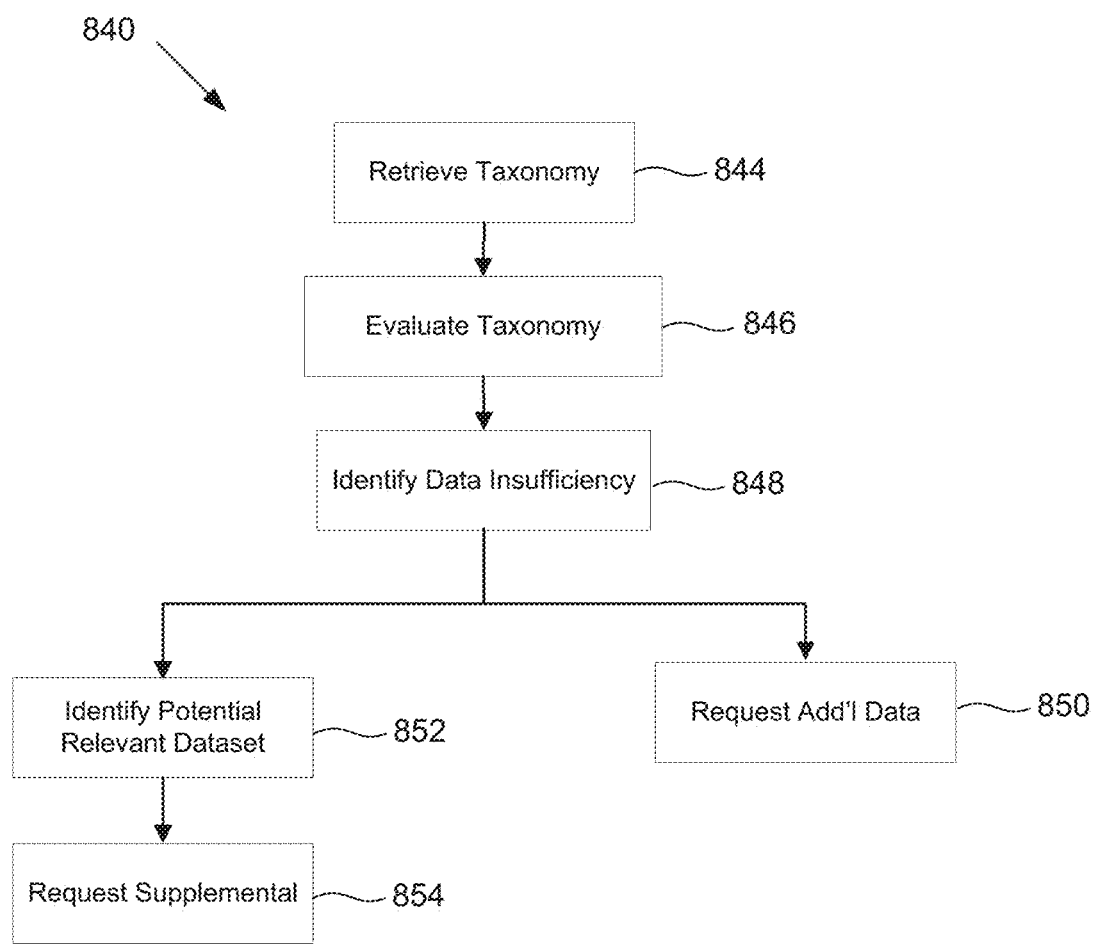
FIG. 11 is a flowchart illustrating one embodiment of a process for evaluation of indexing.

With reference now to FIG. 11, a flowchart illustrating one embodiment of a process 840 for evaluation of indexing is shown. The process 840 can be performed as a part of step 708 of FIG. 6, or as a supplemental step to process 700 of FIG. 6. The process 840 can be performed by all or portions of the virtual research platform 200. The process 840 begins at block 844, wherein the taxonomy is received. In some embodiments, the taxonomy is the taxonomy used by the virtual research platform 200. The taxonomy can be received and/or retrieved from the database 216. In some embodiments, the receipt and/or retrieval of the taxonomy can include receipt of information identifying the categories and/or hierarchy of the taxonomy and/or information identifying the amount of data in some or all of the categories of the taxonomy.

At block 846, the taxonomy is evaluated. In some embodiments, the evaluation of the taxonomy can include an evaluation of the amount of data associated with some or all of the categories of the taxonomy to determine if a sufficient amount of data is associated with some or all of these categories to allow use of the data. In some embodiments, this evaluation can include selecting a category in the taxonomy, retrieving information indicative of the amount of data associated with the selected category, and comparing the amount of data associated with the selected category to a threshold value. If the threshold value is met or exceeded, then the data is sufficient, if the amount of data associated with the selected category does not meet or exceed the threshold, then a data insufficiency is identified as indicated in block 848.

When a data insufficiency is identified, additional data can be requested as indicated in block 850. In some embodiments, this can include a request from source devices for any new or further content data. In response to this request, additional data may be provided, which data can be processed as indicated in process 700 of FIG. 6.

In some embodiments, identification of a data insufficiency can trigger taking action to mitigate the data insufficiency. In some embodiments, this can include identification of a potential relevant dataset as indicated in block 852 and a request for supplemental evaluation of the potential relevant dataset 854. In some embodiments, the potential relevant subset can comprise a subset of all of the data in the virtual research platform 200. Using the hierarchy of the taxonomy, if a category has a data insufficiency, potential relevant data and/or a potential relevant dataset for addressing this data insufficiency can be identified by identifying data associated with parent categories. In some embodiments, this can include moving up one level in the hierarchy of the category to identify parent categories and identifying data associated with the parent categories. The data associated with the parent categories can be provided for supplemental evaluation. In some embodiments, this supplemental evaluation can include the re-performing the tagging process to determine if any of the potential data set are relevant to the category with the data insufficiency. In some embodiments, for example, if the this can include lowering the evidence score threshold. In some embodiments, for example, if the confidence score of a text string is too low, then a tag is not generated for that text string. By lowering the evidence score threshold, some of these character strings with low confidence scores will now have sufficient confidence score to allow tag generation. This may result in more data associated with the category having the data insufficiency, which may overcome the data insufficiency.

Figure 12:
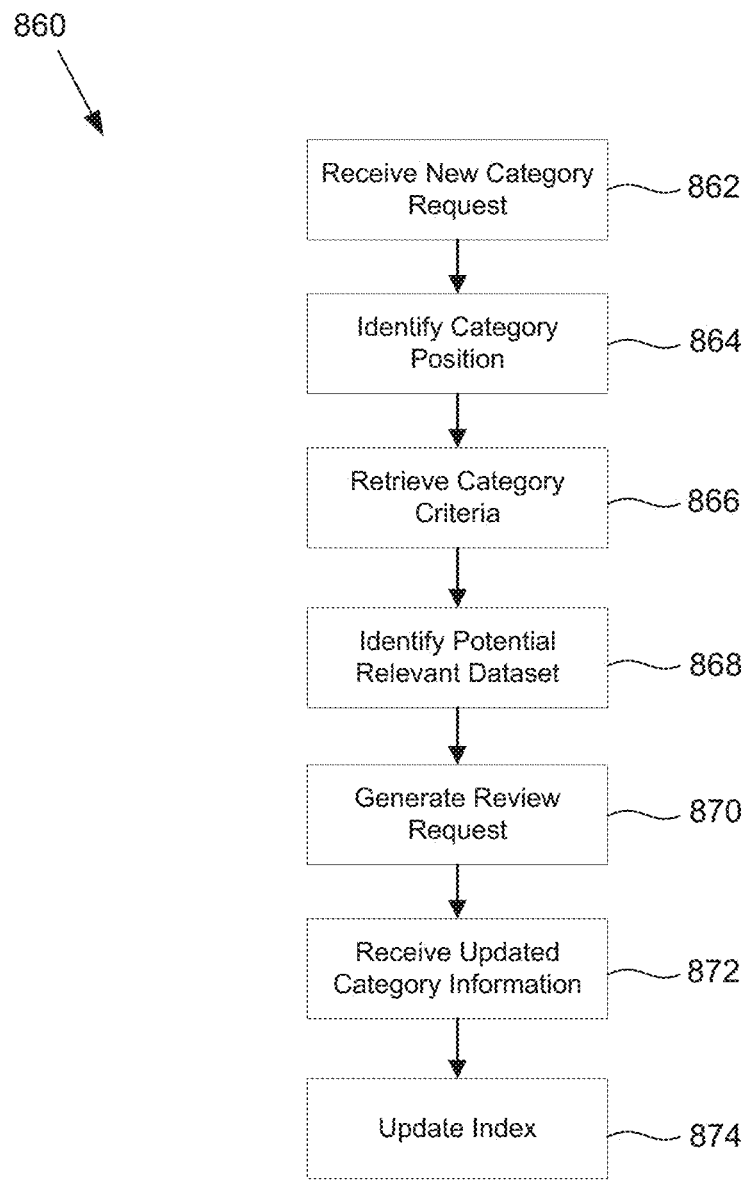
FIG. 12 is a flowchart illustrating one embodiment of a process for updating the taxonomy.

With reference now to FIG. 12, a flowchart illustrating one embodiment of a process 860 for updating the taxonomy is shown. The process 860 can be performed by all or portions of the virtual research platform 200. The process begins at block 862, wherein a new category request is received. In some embodiments, this can be a request to add a new category to the taxonomy. The new category request can be received by the virtual research platform 200.

After the new category request has been received, the process 860 proceeds to block 864, wherein the position of the new category in the taxonomy is determined and/or identified. In some embodiments, this position can be determined and/or identified based on information received in the new category request. In some embodiments, this information can identify one or several parent categories and/or one or several child categories. At block 866 category criteria are received. In some embodiments, these category criteria comprise information for use in determining when content data belongs to the category. These category criteria can identify one or several words indicative of the category and/or one or several detectable attribute of a payload belonging to the category. These category criteria can be received with or subsequent to the new category request.

At block 868 one or several potential relevant datasets to the new category are identified. In some embodiments, these one or several relevant datasets can be identified based on parent and/or child categories in the taxonomy as discussed above in block 852. After the potential relevant dataset is identified, the process 860 proceeds to block 870, wherein a review request is generated. The review request can identify the potential relevant dataset and provide category criteria. The review request can comprise a request for the tagging module 215 to evaluate data in the potential relevant dataset to determine if any of the potential relevant dataset belong in the new category. In some embodiments, this can include evaluation of the content file as discussed above in process 760.

After the potential relevant dataset has been evaluated, the process 860 proceeds to block 872, wherein updated category information is received. This updated category information can include any changes to tagging based on the review request of block 870. In some embodiments, this updated category information can indicate any of the potential relevant dataset identified as belonging to the new category. After the updated category information has been received, the process 860 proceeds to block 874, wherein the taxonomy is updated to include the new category. In some embodiments, this can further include linking the new category to data relevant to the new category.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments. It is also the case that modules, software, or algorithms can be performed on one server, multiple servers or share the same server. A platform is a major piece of software, such as an operating system, an operating environment, or a relational database or data store, under with various smaller application programs can be designed to run. An operating system is the most important software program running on most computer systems. It manages a processors memory, processes, all of the software and programs loaded onto it, and all of the connected hardware. The operating system's job is to manage all of the software and hardware on the computer. Most of the time, there are many different software programs operating at once as well as multiple connected hardware devices. There are many operating systems—the most basic is the disk operating system or "DOS." Each type of computer or device typically has its own different operating systems. Some typical operating systems are iOS, Windows, Android, and Linux.

The networks disclosed may be implemented in any number of topologies. A network is made of many computing devices that can include computers, servers, mainframe computers, network devices, peripherals, or other devise connected together. A network allows these devices to share data and communicate with each other. The most prominent network is the Internet—that connects billions of devices all over the world. There are many types of network devices including: computers, consoles, firewalls, hubs, routers, smartphones, switches, wearables, watches, and cameras. Networks are set up in many different ways referred to as network topologies. Some of the most common topologies include tree, hybrid, ring, mesh star, and bus. The tree topology is the generally used topology. A computer is typically an electronic device for storing and processing data according to instruction it reads. A console is a text entry and display device. A firewall is network security system, either hardware- or software-based, that controls incoming and outgoing network traffic based on a set of rules, and acts as a barrier between a trusted network and other untrusted networks—such as the Internet—or less-trusted networks—a firewall controls access to the resources of a network through a positive control model. This means that the only traffic allowed onto the network defined in the firewall policy is; all other traffic is denied. A hub is a connection point for multiple devices in a network. A hub typically has multiple ports such that if packets of data arrive at one port they are copied to the other ports. A router is a device that forwards data packets along the network. A router connects two or more networks such as an intranet to the internet. Routers use headers and forwarding tables to determine how data packets should be sent using certain paths in the network. The typical router protocol using ICMP to communicate and configure the best path. A network switch is different from a router. Switches serve as controllers that enable networked devices to communicate with each other. Switches create networks while routers connect networks together.

Networks operate on the seven layer open system interconnection (OSI) model. The OSI model defines a conceptual networking framework to implement protocols and divides the task of networking into a vertical stack of the seven layers. In the OSI model, communication control is passed through the layers from the first to the seventh layer. The first or "top" layer is the "physical" layer. Layer 1 transmits the bit stream of ones and zeros indicated by electrical impulse, light, or radio frequency signals—thus providing a method of interactiong with actual hardware in a meaningful way. Examples of the physical layer include Ethernet, FDDI, B8ZS, V.35, V.24, and RJ45. The second layer is called the Data Link layer. At layer 2 data packets are encoded and decoded into a bit stream in compliance with transmission protocols that control flow control and frame synchronization. The Data Link layer 2 is actually a combination of two different layers: the Media Access Control (MAC) layer and the Logical Link Control (LLC) layer. The MAC layer controls a computer's access to the network. The LLC basically controls frame synchronization, flow control, and various types of error correction. Examples of the Data Link layer include PPP, FDDI, ATM, IEEE 802.5/802.2, IEEE 802.3/802.2, 802.11, HDLC, and Frame Relay. The third OSI layer, called the "Network" layer, provides the switching and routing technology to create logical paths to transmit data from one node to another in the network. Layer. The Network layer also performs the function of routing, forwarding, addressing, internetworking, error handling, congestion control, and packet sequencing. Layer 3 examples include AppleTalk, DDP, IP, and IPX. The fourth OSI layer is the Transport layer. Layer 4 provides transparent transfer of data between devices. Layer 4 also performs error recovery and provides flow control for complete data transfer. Examples of layer 4 include SPX, TCP, and UDP. OSI layer 5 called the Session layer because it manages and terminates the connections between different applications. The Session layer coordinates communication between applications. It sets up communications and terminates the communications between applications at each end—establishing and ending a "session." Examples include NFS, NetBios, names, RPC, and SQL. Layer 6 is called the Presentation Layer. Layer 6 is really the "transformation" layer—transforming data from the final layer to a format the network understands and vice versa. Layer 6 formats and encrypts data sent on the network and decrypts the data from the network. Examples include ASCII, EBCDIC, TIFF, GIF, PICT, JPEG, MPEG, and MIDI. Finally, the last layer 7, is called the Application Layer. Everything at this layer is specific to applications, and this layer provides the services for email, file transfers, and other network applications. Examples include WWW browsers, NFS, SNMP, FTP, Telnet, and HTTP.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), complex instruction set computers (CISCs), reduced instruction set computers (RISCs), advanced RISC machines (ARMs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof. A processor is implemented in logic circuitry that includes the basic functions of AND, NAND, OR, and NOR functions. The circuitry responds to the basic instructions that operate an computing device. In some computing devices the processor is actually referred to a as microprocessor. Functionally, processors are typically composed of RAM as well as address and data buses, the processing circuitry and accumulators. The busses supply the data and programming instructions from RAM, ROM, CACHE, or other memory to the processing circuitry. The speed of a processor depends both on the speed of the processing circuitry as well as the speed of the data and address busses that supply the circuitry. And the speed of the data and address buses are also gated by the speed of the RAM. It is critical that all of these components have speeds that are matched to one another to maximize processor performance. Processors use machine level instruction codes to manipulate data. Other instructions must be compiled to machine level instructions to for the processor to perform the operations. Dual core processors have dual processing circuitry and multiple address and data buses.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data. Cache memory, also called the central processing unit (CPU) memory, is random access memory that the processor can access more quickly than standard RAM. Cache memory is typically integrated into the circuitry with the processing unit, but sometimes can be placed on a separate chip. The principle purpose of cache memory is to store the program instruction for the operational software such as an operating systems. Most long running software instructions reside in cache memory if they are accessed often.

While the principles of the disclosure have been described above in connection with specific apparatuses and methods, it is to be clearly understood that this description is made only by way of example and not as limitation on the scope of the disclosure.

What is claimed is:

1. A system comprising:
    memory comprising a plurality of storage bins, each of the plurality of storage bins assigned to a content owner;
    a service layer configured to issue an encryption key to each content owner to which at least one of the plurality of storage bins is assigned;
    at least one processor configured to packetize a first data file comprising a first text file and a first image file, wherein packetizing the first data file comprises:
    deidentifying the first data file via extraction of a target portion from at least the first image file of the first data file, the targeted portions excluding personalized data; and
    creating the packetized first data file from the extracted target portion; and
    at least one server communicatingly coupled with the memory, wherein the at least one server is configured to:
        receive the packetized first data file;
        automatically generate at least one tag for the packetized first data file, wherein the at least one tag is automatically generated based at least one key phrase identified in at least a targeted portion of the first data file;

index the packetized first data file according to the at least one tag into a predetermined taxonomy;
select data in response to a user data request comprising parameters identifying at least one tag; and
deliver the selected data.

2. The system of claim 1, wherein packetizing the first data file further comprises:
identifying targeted portions from the first image file and the first text file;
generating a first packet from the first data file;
generating a second packet from first metadata of the first data file; and
generating a third packet from the first image file of the first data file, wherein the first packet is stored in a first bin of the storage bins, wherein the second packet is stored in a second bin of the storage bins, and wherein the third packet is stored in a third bin of the storage bins.

3. The system of claim 2, wherein the at least one processor executes a gateway client application.

4. The system of claim 3, wherein the gateway client application is on the at least one server.

5. The system of claim 4, wherein automatically generating at least one tag for the packetized first data file comprises: selecting the third packet generated from the first image file; identifying a horizontally linked packet, wherein the horizontally linked packet comprises the first packet associated with the selected third packet; and evaluating the first packet.

6. The system of claim 5, wherein evaluating the first packet comprises: parsing the first packet; identifying character strings within the first packet; generating an evidence score for each of the identified character strings; and linking the generated evidence score to the character string for which the evidence score was generated.

7. The system of claim 6, wherein evaluating the first packet further comprises: determining an insufficiency of the evidence score for a character string; identifying at least one linked vertical packet; evaluating the identified vertical packet; and modifying the evidence score based on the evaluation of the identified vertical packet, wherein indexing the packetized first data file comprises storing each of the first, second, and third packets in a structured database.

8. The system of claim 2, wherein the at least one server is further configured to: identify related data files; and link the generated packets to packets generated for related data files.

9. The system of claim 8, wherein the at least one server is further configured to transmit the linked packets to an indexing server.

10. The system of claim 9, wherein the at least one server is further configured to: evaluate the taxonomy; identify a data insufficiency for at least one category in the taxonomy; identify a subset of data potentially relevant to the at least one category in the taxonomy; and take action to mitigate the data insufficiency.

11. A method comprising:
assigning at least one of a plurality of storage bins located in memory to a content owner;
issuing an encryption key to the content owner via a service layer;
receiving a first data file at a gateway client application from a first source;
packetizing the first data file with the gateway client application to deidentify the first data file, wherein the first data file comprises a first text file and a first image file, wherein packetizing the first data file comprises:
deidentifying the first data file via extraction of a target portion from at least the first image file of the first data file, the targeted portions excluding personalized data; and
creating the packetized first data file from the extracted target portion;
receiving the packetized first data file;
automatically generating at least one tag for the packetized first data file based on at least one key phrase identified in the first data file;
indexing the packetized first data file according to the at least one tag into a predetermined taxonomy;
select data in response to a user data request from a user, the user data request comprising parameters identifying at least one tag; and
delivering the selected data to the user.

12. The method of claim 11, wherein packetizing the first data file comprises: generating a first packet from a first content file; generating a second packet from first metadata of the first data file; and generating a third packet from a first image file of the first data file.

13. The method of claim 12, wherein the first packet is stored in a first database, wherein the second packet is stored in a second database, and wherein the third packet is stored in a third database.

14. The method of claim 13, wherein automatically generating at least one tag for the packetized first data file comprises: selecting the third packet generated from the first image file; identifying a horizontally linked packet, wherein the horizontally linked packet comprises the first packet associated with the selected third packet; and evaluating the first packet.

15. The method of claim 14, wherein evaluating the first packet comprises: parsing the first packet; identifying character strings within the first packet; generating an evidence score for each of the identified character strings; and linking the generated evidence score to the character string for which the evidence score was generated.

16. The method of claim 15, further comprising: determining an insufficiency of the evidence score for a character string; identifying at least one linked vertical packet; evaluating the identified vertical packet; and modifying the evidence score based on the evaluation of the identified vertical packet.

17. The method of claim 16, wherein indexing the packetized first data file comprises storing each of the first, second, and third packets in a structured database.

18. The method of claim 12, further comprising: identifying related data files; and linking the generated packets to packets generated for related data files.

19. The method of claim 18, further comprising transmitting the linked packets to an indexing server.

20. The method of claim 19, further comprising: evaluating the taxonomy; identifying a data insufficiency for at least one category in the taxonomy; identifying a subset of data potentially relevant to the at least one category in the taxonomy; and taking action to mitigate the data insufficiency.

* * * * *